US012729980B2

(12) United States Patent
Scheuerman et al.

(10) Patent No.: US 12,729,980 B2
(45) Date of Patent: Sep. 8, 2026

(54) DYNAMIC PARAMETERIZATION OF DIGITAL MAPS

(71) Applicant: The Government of the United States of America, as represented by the Secretary of the Navy, Arlington, VA (US)

(72) Inventors: Jaelle P. Scheuerman, Metairie, LA (US); Christopher J. Michael, Covington, LA (US); Elias Z. Ioup, New Orleans, LA (US); Dina M. Acklin, New Orleans, LA (US); Jason L. Harman, Baton Rouge, LA (US); Brent A. Barré, Covington, LA (US); Bradley M. Landreneau, Mandeville, LA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 491 days.

(21) Appl. No.: 17/751,945

(22) Filed: May 24, 2022

(65) Prior Publication Data

US 2022/0381582 A1 Dec. 1, 2022

Related U.S. Application Data

(60) Provisional application No. 63/202,049, filed on May 25, 2021.

(51) Int. Cl.

| | |
|---|---|
| ***G01C 21/00*** | (2006.01) |
| ***G01C 21/36*** | (2006.01) |
| ***G06N 20/00*** | (2019.01) |

(52) U.S. Cl.
CPC ......... *G01C 21/3889* (2020.08); *G01C 21/36* (2013.01); *G01C 21/3811* (2020.08); *G06N 20/00* (2019.01)

(58) Field of Classification Search
None
See application file for complete search history.

(56) References Cited

U.S. PATENT DOCUMENTS

| | | | | |
|---|---|---|---|---|
| 12,295,753 B2 * | 5/2025 | Yoo | ........................... | G06T 7/10 |
| 2011/0260908 A1 * | 10/2011 | New | ...................... | G01S 7/292 342/59 |

(Continued)

FOREIGN PATENT DOCUMENTS

| | | | | |
|---|---|---|---|---|
| WO | WO-2022081377 A1 * | 4/2022 | ............ | G06F 18/40 |

*Primary Examiner* — Kieu D Vu
*Assistant Examiner* — David V Luu
(74) *Attorney, Agent, or Firm* — US Naval Research Laboratory; Nigel R. Fontenot

(57) ABSTRACT

A method including receiving a request associated with one or more map views associated with a map, transmitting a first set of one or more map views, generating a display of at least one of the first set of one or more map views, receiving a user input associated with the display of the at least one of the first set of one or more map views, and receiving a message associated with the user input. The method may include deter mining a mapping context function based on the received message, the mapping context function being based on one or more user actions associated with one or more features on at least one previously accessed map, determining whether to modify a second set of one or more map views based on the mapping context function, and transmitting the second set of one or more map views.

38 Claims, 25 Drawing Sheets

(56) References Cited

U.S. PATENT DOCUMENTS

| | | | | |
|---|---|---|---|---|
| 2013/0339891 | A1* | 12/2013 | Blumenberg | G06F 16/9537 715/771 |
| 2015/0185990 | A1* | 7/2015 | Thompson | G01C 21/367 715/800 |
| 2020/0027552 | A1* | 1/2020 | Lee | A61B 5/746 |
| 2020/0373001 | A1* | 11/2020 | Harrison | G06Q 30/0631 |
| 2021/0049328 | A1* | 2/2021 | Choi | G06F 16/332 |
| 2022/0198949 | A1* | 6/2022 | Jain | G09B 5/12 |
| 2022/0317826 | A1* | 10/2022 | Kitazawa | G06F 9/453 |
| 2023/0274468 | A1* | 8/2023 | Kaur | G06T 7/0004 345/619 |

* cited by examiner

AML typically one-way information flow from data to classifier to analyst

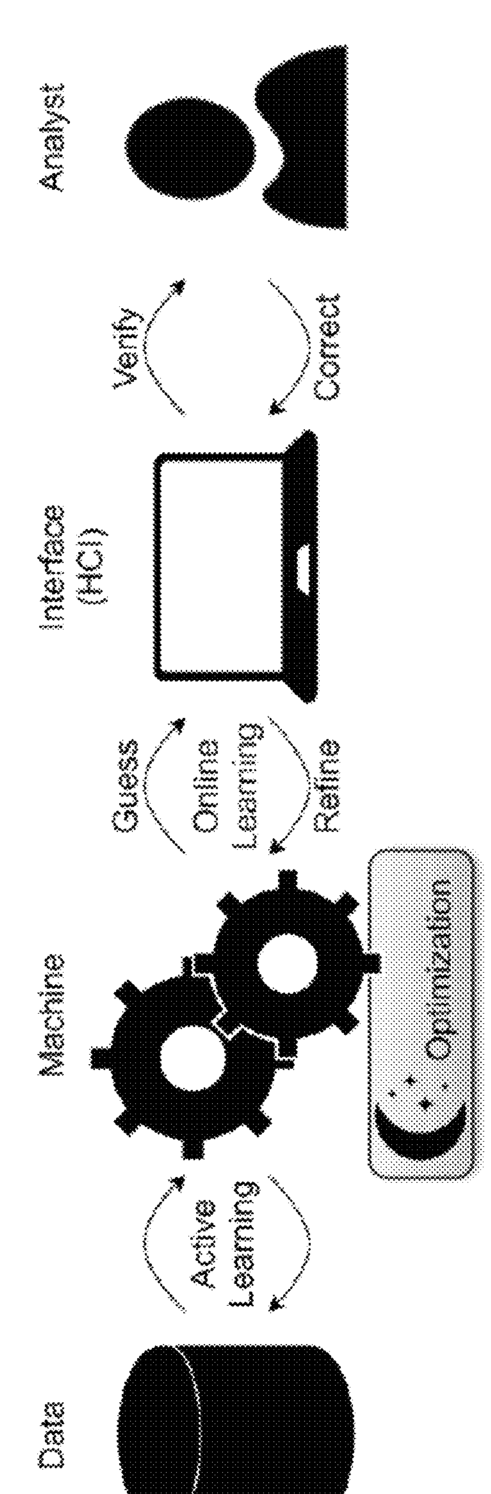

IML is centered around the analyst, who will actively verify and correct via an interface

- Solves all-or-nothing frustration
- Cold-start enabled

Online ML is used to quickly train and refine the model from user's input

- Concept drift & evolution

Active learning is used to present guesses that converge the model as quickly as possible When offline, optimization of IML model

- Analogous to AML

FIG. 4a

- Features:
  - Interactive learning algorithm that learns label placement preferences through map interactions.
  - A "like" button lets analysts give immediate feedback about the view.
  - Analysts can move or hide labels within provided constraints.
  - Interactive learning algorithm applies feedback to future map views.

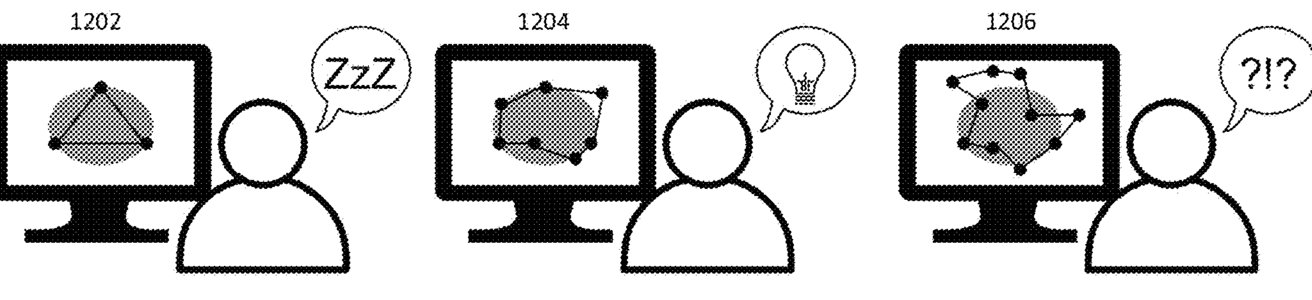

Underconfident Model
ML learns too slowly

Cognitive-Attuned Model
Productive human-machine team

Overconfident Model
High cognitive load

Understand cognitive load of analyst in HAML system.

- Too many incorrect guesses → Analyst will be slowed down and get frustrated.
- Not enough guesses → Analyst spends more time than necessary training model.

Measure productivity and improve human-machine team through:

- Self Reporting
- Implicit Feedback
- Modeled feedback

FIG. 12

DYNAMIC PARAMETERIZATION OF DIGITAL MAPS

CROSS-REFERENCE

This Application is a nonprovisional application of and claims the benefit of priority under 35 U.S.C. § 119 based on U.S. Provisional Patent Application No. 63/202,049 filed on May 25, 2021. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #109643.

TECHNICAL FIELD

The present disclosure is related to dynamic parameterization of digital maps, and more specifically to, but not limited to, an interactive mapping tool using machine learning techniques.

BACKGROUND

For centuries, cartographers have conducted the time-consuming task of designing detailed maps, and in the process have created many best practices and standards for representing geographic information accurately at scale. In recent decades, geographic information systems (GIS) and interactive online maps have become very popular, forcing mapmakers to consider how to apply these best practices to digital maps. Digital maps offer functionality that might not be available in printed maps, such as palming, adjusting the scale to a fine degree, and adding layers, but they also present many challenges for generating high-quality layouts on the fly. Mapmakers have turned to algorithmic and machine learning approaches in an effort to reduce the time spent on manual approaches.

Map label placement may be one of the most tedious processes in map creation. For the map to have utility, labels may be placed near their associated features in a readable way, without colliding with or obscuring other labels. This task has been proven to be at least NP-complete, even in its simplest form. Digital maps make the problem more complex, requiring optimal placements to be recalculated as layers may be added and removed, and at different scales. Many heuristic algorithms have been suggested to approximate label placements more quickly. However, the resulting map labeling layouts produced by automatic algorithms often do not meet the standards of quality set forth by cartographers.

Digital maps may be commonly used to plan routes and navigate, whether by car on a street map or by plane with aeronautical charts. Other uses include visualizing and understanding spatial features or making decisions about how to deploy resources over a geographic area. In these scenarios, maps may often show large amounts of relevant spatial information to the user in an intuitive display that minimizes label collisions and clutter. In many situations, users may need to explore the map by adjusting the scale, panning, or adding and removing layers of information. However, these adjustments may lead to maps that may be cluttered and difficult to use.

An interactive digital map may be a map output and/or presented on a display, such as one where some user may zoom in, zoom out, or pan freely within the map). An example of such a map is GOOGLE MAPS. When users view a digital map, they usually have access to an interactive legend where they can turn layers in their current view on and off. An example of this may be the traffic layer on GOOGLE MAPS, where users can turn the layer on and off depending on their preference at the time of viewing. As the user zooms in and out of the map, the traffic layer may be visualized differently based on the scale of the current view of the map. The visualization preference of the traffic may be typically referred to as a parameter. Unlike GOOGLE MAPS, other map products may contain tens to hundreds of different layers, and each of these layers may have dozens of parameters for improving the map view based on the user's need. For example, ESRI's ArcGIS software allows the user to change a layer's symbols and set scale thresholds for viewing the layer among many other custom parameters. A disadvantage to this, the current state of the art, includes the fact that the parameter space for each layer may be vast, complicating the digital map implementation. Furthermore, users of current digital map products spend a significant amount of time tuning these parameters as they view the map.

Several computational approaches exist for automating map generation. Label placement algorithms seek to label features in such a way as to minimize collisions. However, this may be a computationally complex problem that can become increasingly difficult as the map symbology increases in density. These complex situations often lead to imperfect views that might not be of the same quality as those created by cartographers, with labels that not well distributed or obfuscate one another.

The following may be two examples of refining map labeling layouts via user interactions. In one example, UserHints allowed users to make edits to a labeling solution, which in turn updates label properties of possible solutions in a conflict graph. An optimization algorithm then chooses the best solution given those edits. This solution allows the user to give the program ideas on how to tweak the output, but it might not learn to apply them more generally (for example at different scales). Another approach allowed users to edit a label and then recalculates the layout for the rest of the labels while keeping the changes fixed.

ESRI's ArcGIS software suite is a conventional dynamic digital-map parameterization. There is a feature that allows for certain layer parameters to be set given a map-scale range. In a way, this parameterization attempts to give the user an ideal map view as they zoom in and out. However, the user must explicitly set these scale ranges explicitly themselves. Moreover, the input feature is limited to scale and might not consider the spatial position of the view, map clutter, or the content within the view.

In terms of geographic information systems, geographic information systems generally consist of large amounts of geographic data that may be organized and displayed for a variety of tasks including navigation, situational awareness, and decision making. The process of generating these maps can require a great deal of both computational resources and analyst's time. Many algorithms exist to help automate feature digitization and generating map displays, but the output of many of these still require an analyst's time to verify that the resulting maps may be accurate and useful.

In recent years, attempts have been made to use machine learning to improve automated tasks like feature digitization and map generalization. However, these approaches also have many challenges. Machine learning algorithms generally require large databases of labeled training data before they may be especially useful. Getting this data may be often a challenge and might not always cover every situation the system will encounter. For example, a sensor may change between the training data and the production system, leading the algorithm to make inaccurate classifications. In this traditional machine learning approach, information generally flows in one direction with the algorithm best being trained on some data and then asked to classify new examples of similar data. Fine-tuning the machine learning output often requires a trained machine learning expert to tweak unintuitive parameters in an effort to improve the accuracy of the classifications.

Thus, there exists a need for a solution to provide the ability to provide a geographic interactive machine learning system that enables users to refine map label layouts, after which the interactive machine learning system learns the intent of those refinements and applies them to subsequent map views. There also exists a need for a solution to provide the ability to provide maps with labels that may be presented in the most view-friendly manner.

SUMMARY

This summary is intended to introduce, in simplified form, a selection of concepts that are further described in the Detailed Description. This summary is not intended, to identify key or essential features of the claimed subject matter, nor is it intended to be used as an aid in determining the scope of the claimed subject matter. Instead, it is merely presented as a brief overview of the subject matter described and claimed herein.

Disclosed aspects provide for a geographic interactive machine learning system that enables users to refine map label layouts, which may be used for interactive map generation, incorporating cognitive feedback, synthetic training data, and concept learning.

This present disclosure entails a method for effectively presenting the various layers of a digital map using an optimization function parameterized by the possible views of the map as well as the content within each of these views. The present disclosure provides for dynamically setting the variable parameters of a map's view based on a mathematical function that maps the current view and content to the parameterization of each layer in the map.

One or more aspects provide for high quality maps that may be generated by interactively learning from direct modifications by map designers and map users. The present disclosure uses interactive machine learning to ascertain better label placements from a user over time. The present disclosure provides for, in some embodiments, SmartMaps, which collects data about how a user interacts with aeronautical charts and uses that information to improve the map display over time.

The present disclosure provides for a method including receiving, by a processing device from a client computing device, a request associated with one or more map views associated with a map accessed by the client computing device, transmitting, by the processing device to the client computing device, a first set of one or more map views, and generating, by the client computing device, a display of at least one of the first set of one or more map views. The method may include receiving, by the client computing device, a user input associated with the display of the at least one of the first set of one or more map views, receiving, by the processing device from the client computing device, a message associated with the user input associated with display of the at least one of the first set of the one or more map views, and determining, by the processing device, a mapping context function based on the received message, the mapping context function being based on one or more user actions associated with one or more features on at least one previously accessed map. The method may include determining, by the processing device, whether to modify a second set of one or more map views based on the mapping context function, and transmitting, by the processing device, the second set of one or more map views responsive to receiving a second request.

The present disclosure provides for a method including receiving, by a processing device, a request associated with one or more map views associated with a map accessed by a client computing device, transmitting, by the processing device to the client computing device, a first set of one or more map views, and receiving, by the processing device, a user input associated with the display of the at least one of the first set of one or more map views, the user input being associated with at least one display characteristic associated with the first set of one or more map views. The method may include determining, by the processing device, a mapping context function based on the user input, the mapping context function being based on one or more user actions associated with one or more features on at least one previously accessed map, determining, by the processing device, whether to modify a second set of one or more map views based on the mapping function, and transmitting, by the processing device, the second set of one or more map views.

The present disclosure provides for a method including transmitting, by a client computing device to a processing device, a request associated with one or more map views associated with a map accessed by the client computing device, receiving, by the client computing device, a first set of one or more map views, generating, by the client computing device, a display of at least one of the first set of one or more map views, and receiving, by the client computing device, a user input associated with the display of the at least one of the first set of one or more map views. The method may include transmitting, by the client computing device to the processing device, a message associated with, the user input associated with display of the at least one of the first set of the one or more map views, receiving, by the client computing device from the processing device, a second set of one or more map views, the second set of one or more map views being based on a mapping context function that is based on the transmitted message and on one or more user actions associated with one or more features on at least one previously accessed map, and generating, by the client computing device, a display at least one of the second set of one or more map views.

BRIEF DESCRIPTION OF THE DRAWINGS

FIG. 4*a* is a schematic flow diagram illustrating an example of interactive machine learning, in accordance with disclosed aspects.

FIG. 12 illustrates a schematic showing machine learning output models of varying degrees, in accordance with disclosed aspects.

DETAILED DESCRIPTION

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present disclosure addresses the problem of generating high-quality maps, especially in interactive situations where maps can be viewed at different scales and layers can be added or removed. Map layout algorithms often may use heuristic approaches that do not always result in maps of the same quality as those created by cartographers. In such cases the map may require further editing by a cartographer after being generated or may require a computer programmer to make changes to the map layout algorithm or heuristic. The present disclosure provides for the highest quality maps by using interactive algorithms that incorporate into a machine learning model information gathered over time from the map designers, users, or the like.

Figure 1:
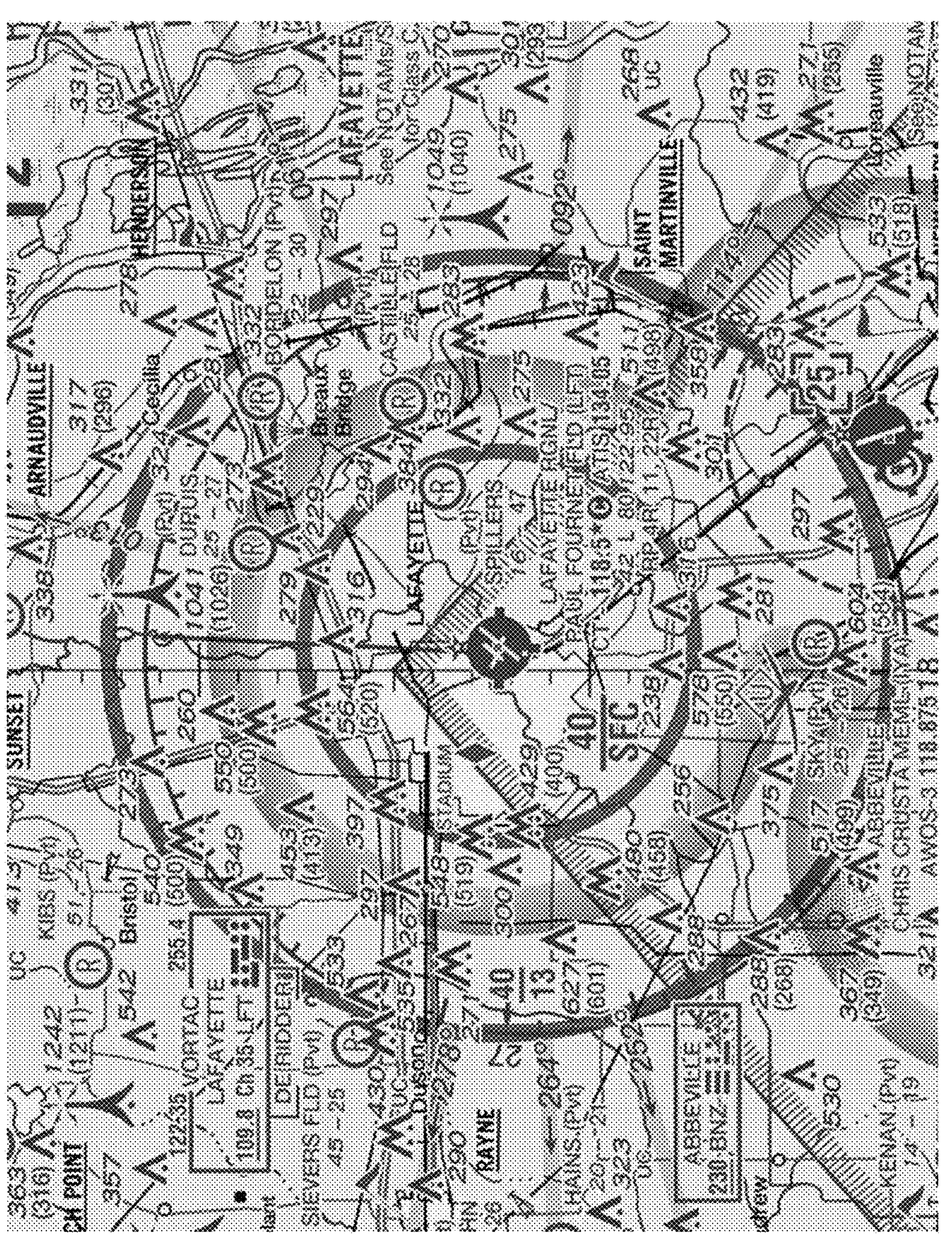
FIG. 1 illustrates an exemplary traditional map, in accordance with disclosed aspects.

Digital map interfaces may be important for visualizing geospatial data, and may be used for tasks including navigation, as decision aids, and for situational awareness. In these applications, new unseen map views may be quickly generated to meet the needs of a user, incorporating information from multiple layers and at different scales. This may be a non-trivial task that frequently leads to digital maps that might not be of the same quality as those produced by human cartographers, such as the map shown in FIG. 1.

Automatic generation of a well-made map can be difficult. A user/analyst may be at the mercy of the map layout algorithm, where the user may desire a different layout than what may be presented to the user. In some cases, there may be a near-infinitely many ways to view or present a map. The present disclosure provides an opportunity to capture the user's preferences, and incorporate those preferences in a feature space of a ML model for generating a digital map.

The present disclosure provides that the best quality map views use computational approaches that interactively learn from map designers and map users.

Geospatial information systems (GIS) support decision making and situational awareness in a wide variety of applications. These often require large amounts of labeled data to be displayed in a way that may be easy to use and understand. Manually editing these displays can be extremely time-consuming for an analyst.

Interactive machine learning (IML) can be applied to help analysts interactively train a region, annotation model over time. The present disclosure provides for interactive systems that can be beneficial for addressing problems that commonly arise in traditional machine learning workflows, such as sparse data and concept drift. For example, an IML system can present its best guess to the user, who corrects it as needed. Using online learning, the algorithm can immediately take the new information into account when generating new guesses. By leveraging the human expertise, interactive machine learning systems can improve the accuracy of a model or adapt to changing situations with less data. This continual feedback loop between the user and the algorithm results in better recommendations over time.

In some embodiments, the present disclosure may be directed to SmartMaps, which incorporates interactive machine learning to improve digital aeronautical chart displays. For example, to improve machine learning models in interactive map interfaces, one or more aspects may include incorporating refinements to a machine learning model, such as user preferences, biometrics, or cognitive models. For example, a viewing client may dynamically request map views from servers. Each view's bounds may be used, to generate a map request to a server and once this request may be processed, the server will then return a fully drawn, rasterized image file of the map for the client to display. Since these map views may be raster images, they may be unable to be edited, which may lead to a user being powerless to edit views in any way. One or more aspects disclosed herein (e.g., SmartMaps) can address this by enabling users to edit map labels given some constraints, which, in some embodiments, may help the interactive machine learning algorithm to quickly and easily learn where to place labels in similar map views.

Figure 2:
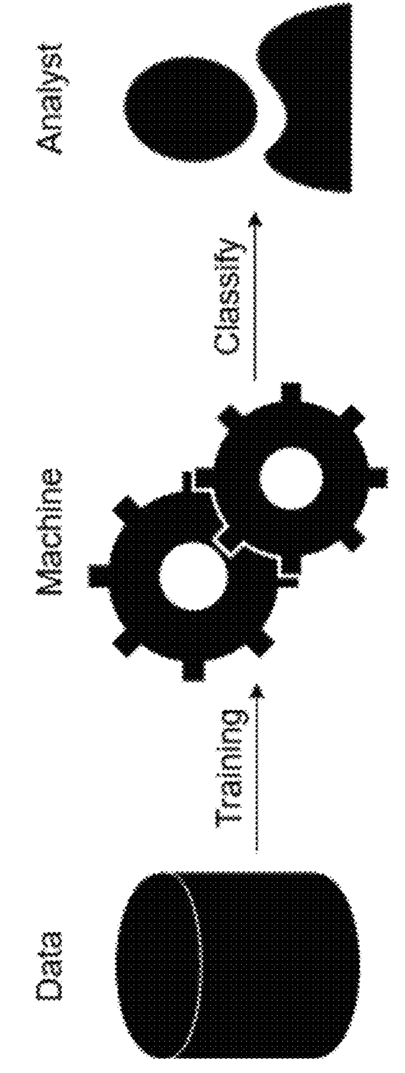
FIG. 2 is a schematic flow diagram illustrating an example of automatic machine learning (AML), in accordance with disclosed aspects.

FIG. 2 is a schematic flow diagram illustrating an example of automatic machine learning (AML). AML typically uses one-way information flow from data to machine/classifier to user/analyst. For example, once a training set of data may be obtained, that training data may be fed to a computer. The computer can then use that training data to train itself to identify concepts associated with the training data by classifying similar data into different classifications. Once classified, the machine can classify new data according to those trained classifications and, can output the classification, such as to a user or analyst.

Figure 3:
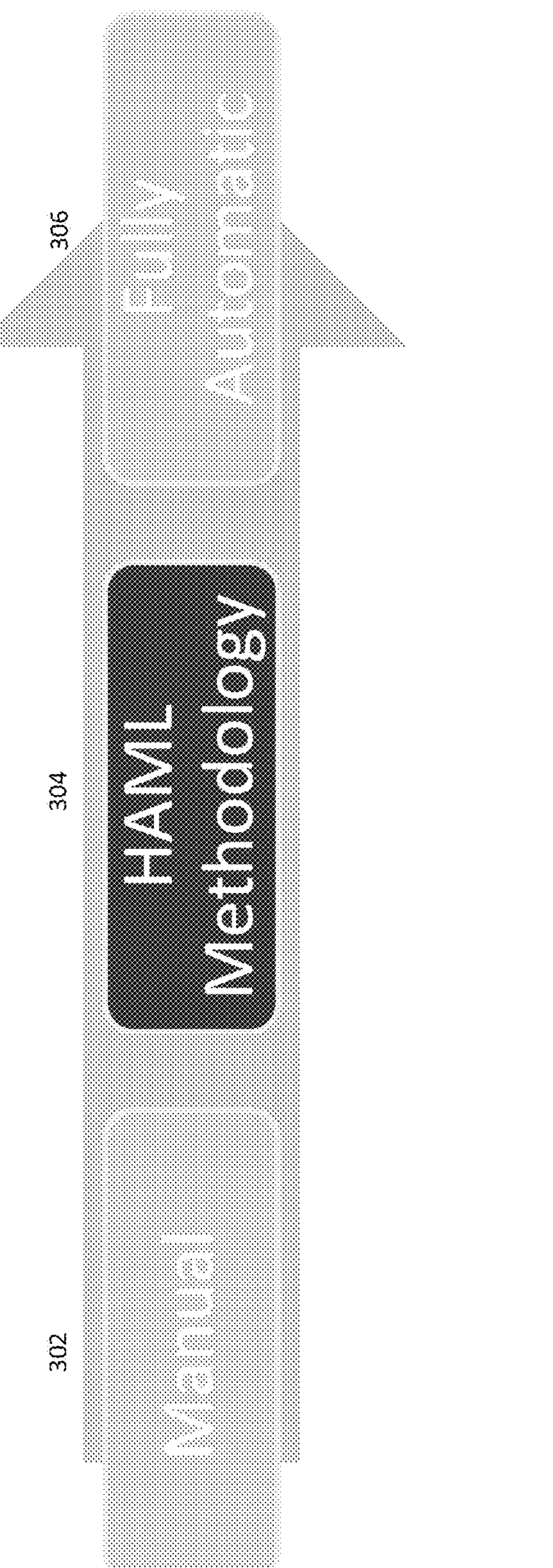
FIG. 3 is a schematic illustrating three levels associated with machine learning on a continuum, in accordance with disclosed aspects.

FIG. 3 is a schematic illustrating three levels associated with machine learning on a continuum. On end 302, there may be a cartographer creating a digital map from scratch with no machine learning applied. This may be performed in a fully human-inputted manner. On end 306, there may be fully automatic machine learning, where the machine/computer provides the classification, such as without classification input from an analyst. A hybrid approach may be provided at 304, with human automated machine learning (HAML), where an analyst can assist with, provide input, refine, and/or modify classifications provided by a computer. A type of HAML can include interactive machine learning (IML).

FIGS. 4*a* is a schematic flow diagram illustrating an example of IML. IML incorporates a user/analyst, who can provide input to information, classifications, etc. output by a computer, such as by actively verifying and/or correcting classifications, such as via an intuitive graphical interface with the computer. IML can be used to quickly train and refine a model from the user's input, which can help with concept drift and evolution. Active learning may be used to present guesses that converge the IML model as quickly as possible. The user can provide input based on the outputs of the model. For example, the user can verify, reject, or the "like" the model and/or classifications via an interface. The model can be optimized by the computer after receiving input from the user (offline), which can be analogous to automatic machine learning by the computer.

Some efforts have been made to use interactive machine learning (IML) to solve some of these traditional machine learning challenges. IML systems can start with little to no training data and iteratively improve through interactions with the user. This may be useful for many GIS applications, where labels and regions may depend on features that cannot always be clearly defined. In the IML workflow, the interface presents its best guess to the analyst, who provides input based on the best guess. Using online learning, the algorithm can immediately take the new information into account when selecting new examples to show the user. Active learning updates the underlying uncertainty model ensuring that the examples that may be shown will reduce the uncertainty, helping the model converge more quickly. This continual feedback loop between the user and the algorithm results in better recommendations over time.

The present disclosure provides for machine learning in GIS. The present disclosure provides for cases where EVIL may be used in GIS systems, and explore some of the design considerations that can improve IML workflows. For example, FIG. 4*b* illustrates a schematic diagram showing geographic interactive machine learning (GIML), which, may be a type of IML (FIG. *a*), and which may use geospatial data (e.g., map data) as the training data.

Figure 4B:
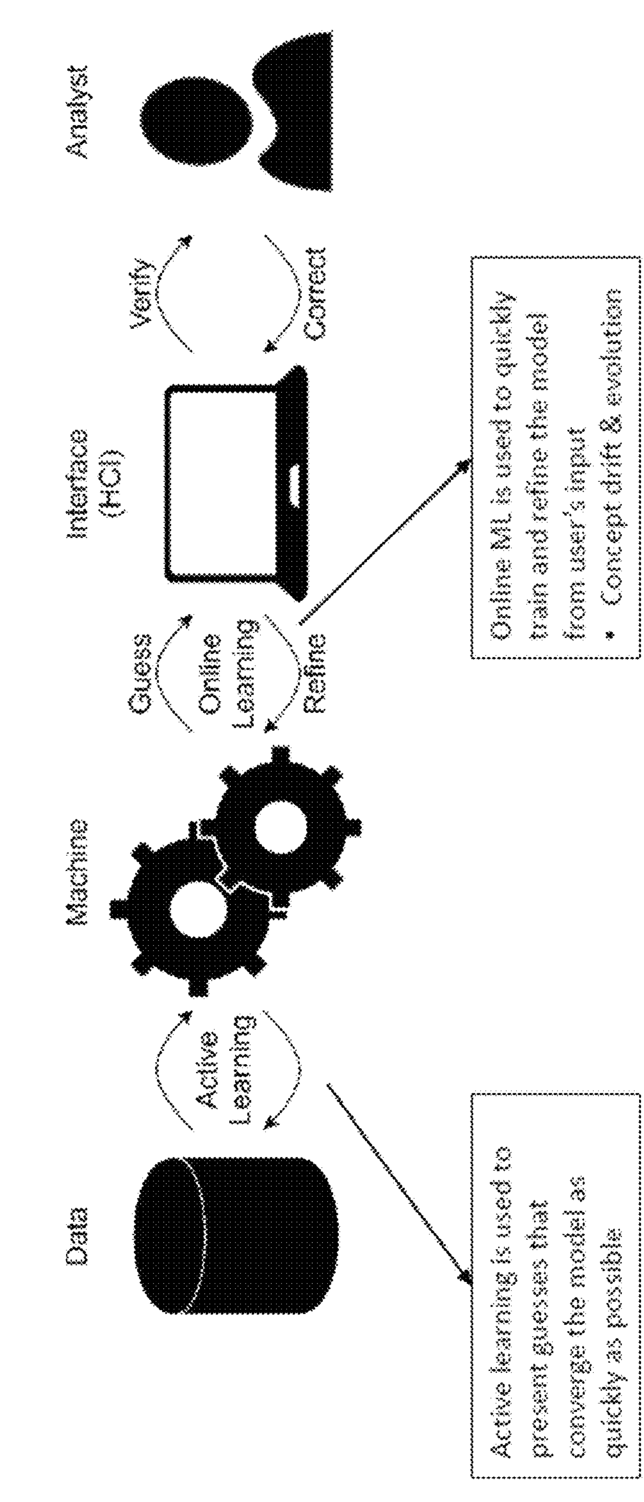
FIG. 4*b* illustrates a schematic diagram showing geographic interactive machine learning, in accordance with disclosed aspects.

As shown in FIG. 4*b*, the machine can use active learning on the data to present guesses that converge the model as quickly as possible. The guesses can be provided via an interface to the analyst In some embodiments, the machine and interface may be part of the same computer system. In some embodiments, the machine may be separate from the interface system. The analyst can act to verify the data and can provide input based on the data. For example, the analyst can correct a data label's location on a map by placing it in a white space that might not have had a label. The analyst can provide that data via a "click-and-drag" interface, in one example. The machine can conduct online machine learning based on the analyst's input to quickly train and refine the model, which can help with concept drift and evolution provided by the machine learning. The machine can refine the model, and then use the revised model with additional data, such as to generate a future map.

Machine learning can leverage today's computational power to generate better digital maps displays. Expert knowledge both from the data and analyst side may be used for each map generated by a machine. IML can tightly couple the learning model with the analyst's verification and correction workflow. IML also can provide code-free human-machine teaming through an intuitive interface.

The present disclosure aims to address and reduce (or remove) the need for users to change parameters when viewing a map by leveraging a rich input/output feature space built around a digital-map user's experience. Input features include the user's current view of the map and the content within that view, while output features correspond to the parameters of each layer of the map. The present disclosure provides for determining a mathematical function that generates output feature values for a given set of input features for characteristics of a map in order to generate an ideal map at any view. For example, a characteristic may be a mapping layer. Such a function may be referred to herein as a Mapping Content Function, or MCF. This can be any function specified by a user or developer. However, in many cases the feature space may be too rich for such a function to be explicitly specified. In such cases, a machine learning implementation may be used to estimate the MCF based on past instances.

Parameters of map layers include the following examples:

- Visibility—whether or not a layer may be viewable in the digital map
- Opacity—to opacity of the map layer
- Priority—where the map layer may be shown relative to other layers—e.g., above or below other layers
- Labeling—whether or not points, lines, and area may be labeled with data
- Symbology—the various symbols used to represent points, lines, or areas on a map Input features can include the user's current view in the map (e.g., the bounding box of the view), the content in that view, or the like. Examples of content include land-to-sea ratio, number of landmarks, and uncertainty of layer data, among many other things. The output features of some other layer may also be used as input features, creating dependencies between each layer's parameterization.

Output features denote the way in which a layer may be visualized while viewing a map. This may be related to a layer's parameters. These parameters may be either represented as a Boolean (true or false) or as a real value, usually normalized to range from 0.0 to 1.0. Visibility may be an example of a Boolean parameter, since a layer may be either visible or not visible. Opacity may be an example of a real value, since a layer may be completely transparent (0.0), translucent (0.1-0.9) or opaque (1.0). For the purposes of this disclosure, real-valued parameters may be expected to be normalized to positive values less than or equal to 1.0.

Mathematical function estimation may be used via machine learning to determine the MCF. For example, there may be two methods for training, or providing a true data point to the machine learning implementation: reinforcement and correction. In reinforcement training, a user may be indicating that the current map view may be ideal. This can be initiated either by continuing to view the map (pan and/or zoom) without parameter intervention or by clicking a button that initiates the reinforcement. In correction learning, a user indicates that they do not like the current view, and they change the parameterization accordingly. Once done, the user indicates the correction by either continuing to view the map or by clicking a button that initiates the correction.

The present disclosure provides advantages over conventional digital maps. For example, during map viewing, in one embodiment, the user no longer has to worry about changing each layer's parameters for every new map view to suit that area or scale to their liking. In addition, in one embodiment, instead of programming the parameterization of layers explicitly, digital map developers may use the disclosed aspects to train a robust machine learning implementation to learn the parameterization, which may be performed, in one embodiment, in a code-free way. In addition, in one embodiment, the MCF can be changed to create new context-specific mapping products based on the user's behaviors, the map type, the situation at hand, the context of the application, or the like. This may remove the need to create specific map implementations in software.

Figure 4C:
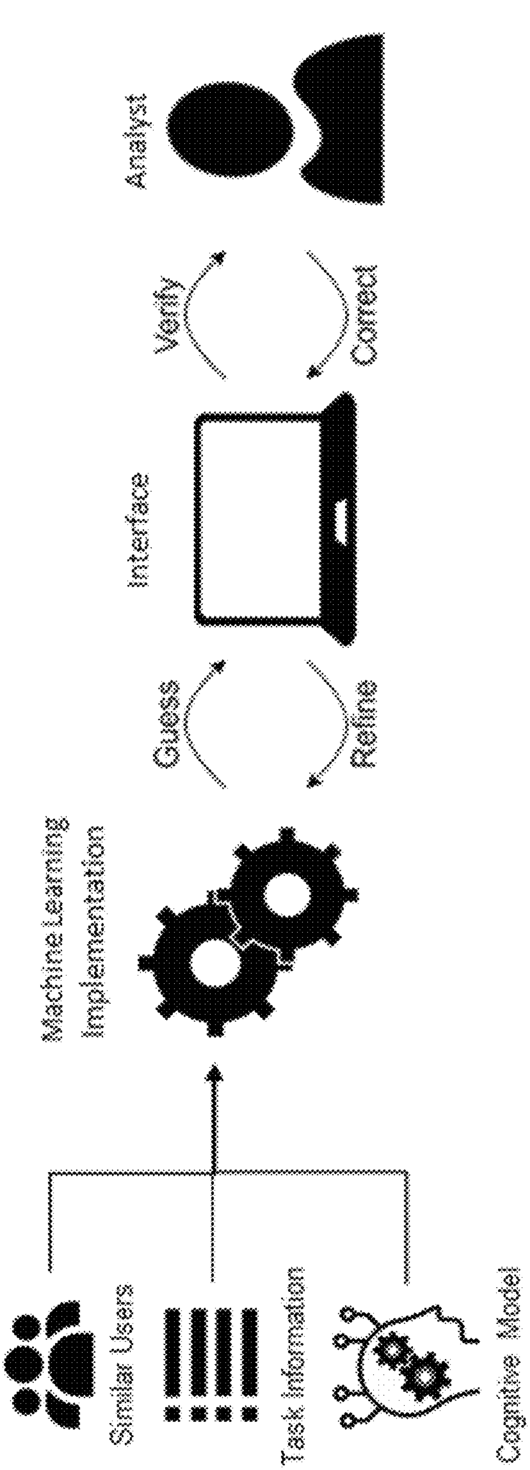
FIG. 4*c* is a schematic illustrating example inputs to a machine learning pipeline, in accordance with disclosed aspects.

FIG. 4*c* is a schematic illustrating example inputs to the ML pipeline that may include synthetic data generated from a cognitive model, information about the current task, or any historical data about similar users' interactions with the map display. These initialize the inductive bias in the ML system, which may be further re-tuned as users interact with the output.

User preferences can also be used to improve an IML system over time. Map displays may especially benefit from being able to personalize the map layers or icons that may be displayed, depending on the user and task at hand. By giving analysts the power to edit label locations and displayed layers, machine learning systems can tailor map interfaces to individuals and task needs. User preferences can be either learned through interactions with the user, or modeled using a combination of cognitive theories and behavioral data.

Example inputs to the ML pipeline may include synthetic data generated from a cognitive model, information about the current task, any historical data about similar users' interactions with the map display, or the like. These initialize the inductive bias in the ML system, which may be further re-tuned based on user input as users interact with the output.

Cognitive feedback can be used to further refine an output and/or interface to best complement an analyst's workflow. Cognitive feedback can refer to information about the cognitive state of the analyst, either collected directly from the user through a self-report mechanism, implicitly through user interactions, eye tracking, or other passive tracking methods, or modeled through a model of human behavior. Collecting such information allows quantifying and formalizing details about the analyst's cognitive state while using the IML system, including cognitive load, vigilance and other factors. This information can be fed into the system to further calibrate it, ensuring that users remain engaged but not overwhelmed.

Complex digital displays require large amounts of training data before they can effectively predict good label placements and the variety of scales and layer combinations that may possibly be displayed. It might not always be practical to collect that many examples through an IML approach. In some embodiments, the model can be trained using synthetic data generated from simulated user interactions modeled after observed user behavior, combined with expert knowledge and heuristic rules. This approach generates a variety of label placements that may be considered a good guess for an average user, but then can be further refined as a user interacts with the map and makes changes to the display.

Cognitive models may be used in human-computer interaction for modeling human interactions with an interface. One or more aspects described herein provide for a cognitive model that simulates an analyst iteratively identifying poorly placed labels or cluttered areas and then moving labels to locations with preferred properties. By using a cognitive model to simulate an analyst making label adjustments on a digital map, the IML algorithm can be initialized with some basic information about features important for generating good label placements, without taking an analyst's time. As the system may be used, the machine learning model will be further fine-tuned with information about the analyst's preferences and interactions, the current task, and/or other relevant features so that it can continue to learn and improve its map generation model.

Data about, the analyst's cognitive state can provide additional information that can be used to improve, map display generation systems. Cognitive inspired features, such as the saliency or eye tracking trajectories, can be used to improve the performance of machine learning algorithm learning using. Such information may provide insight, into the cognitive state of the user. For example, a cognitive model, may be used to estimate a user's subjective perception of clutter, or estimate the cognitive load of editing the map or completing a specific task using the map interface. Such data may then be used to constrain the problem space, or fed into a machine learning model so that it can identify new statistical features that may be useful in generating better map displays.

Example label placement cues may include perceptual cues, contextual cues, and/or other cues. Perceptual cues may include salience, label density, label size, spatial distribution, or the like. Contextual cues may include label type, relationship to nearby elements, map purpose, or the like. Some other cues may include preferences and cartography best practices. In some cases, input from the user can include eye tracking, mouse tracking, and the like.

Figure 5:
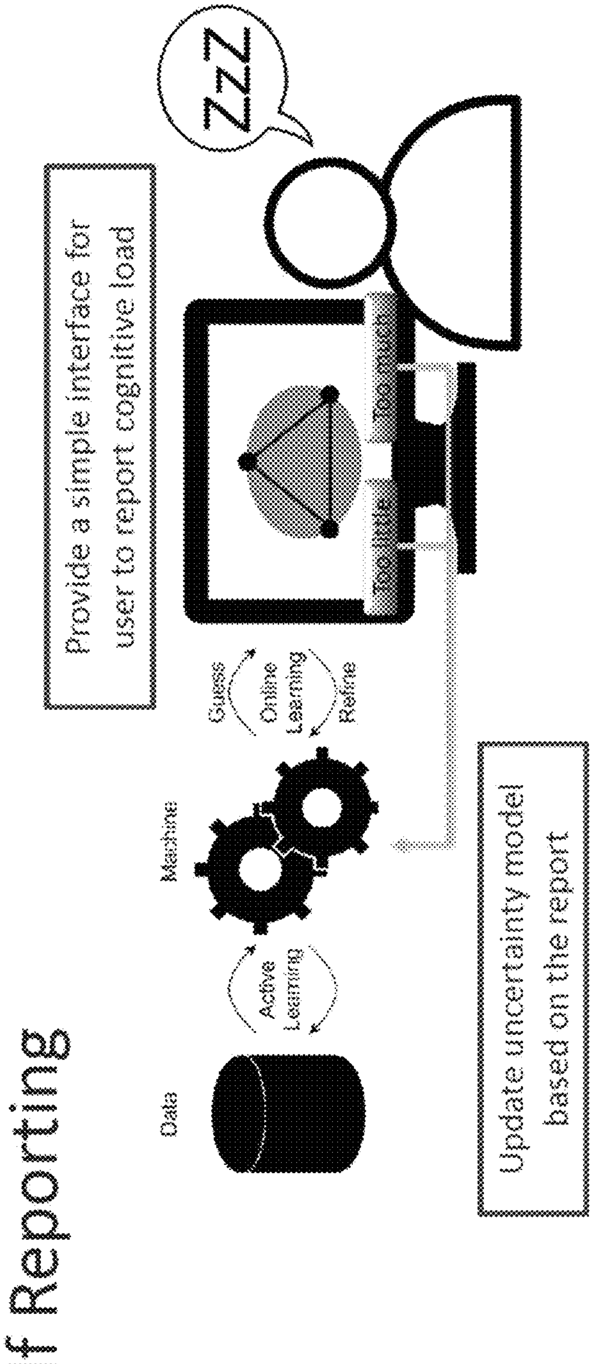
FIG. 5 illustrates a schematic diagram showing a self-reporting input by the analyst/user, in accordance with disclosed aspects.

FIG. 5 illustrates a schematic diagram showing a self-reporting input by the analyst/user. As shown in FIG. 5, the interface used by the analyst/user to provide input to the IML model may be simple enough for the user to provide and report cognitive load or other input. For example, when the machine provides a guess output, the user receives the output and determines if the fit of the model may be accurate. As shown in FIG. 5, the analyst can input that there may be too little information or too much information output to the user. After the analyst provides input, the model (ML model) can be updated based on the received input.

In some embodiments, IML can include having the analyst actively verifying or correcting the output of a machine learning algorithm. In some embodiments, IML can be implemented in environments with little pre-existing training data. In some embodiments, IML can allow for online learning to iteratively refine the model. In some embodiments, IML can provide active learning that can speed up model convergence.

Figure 6:
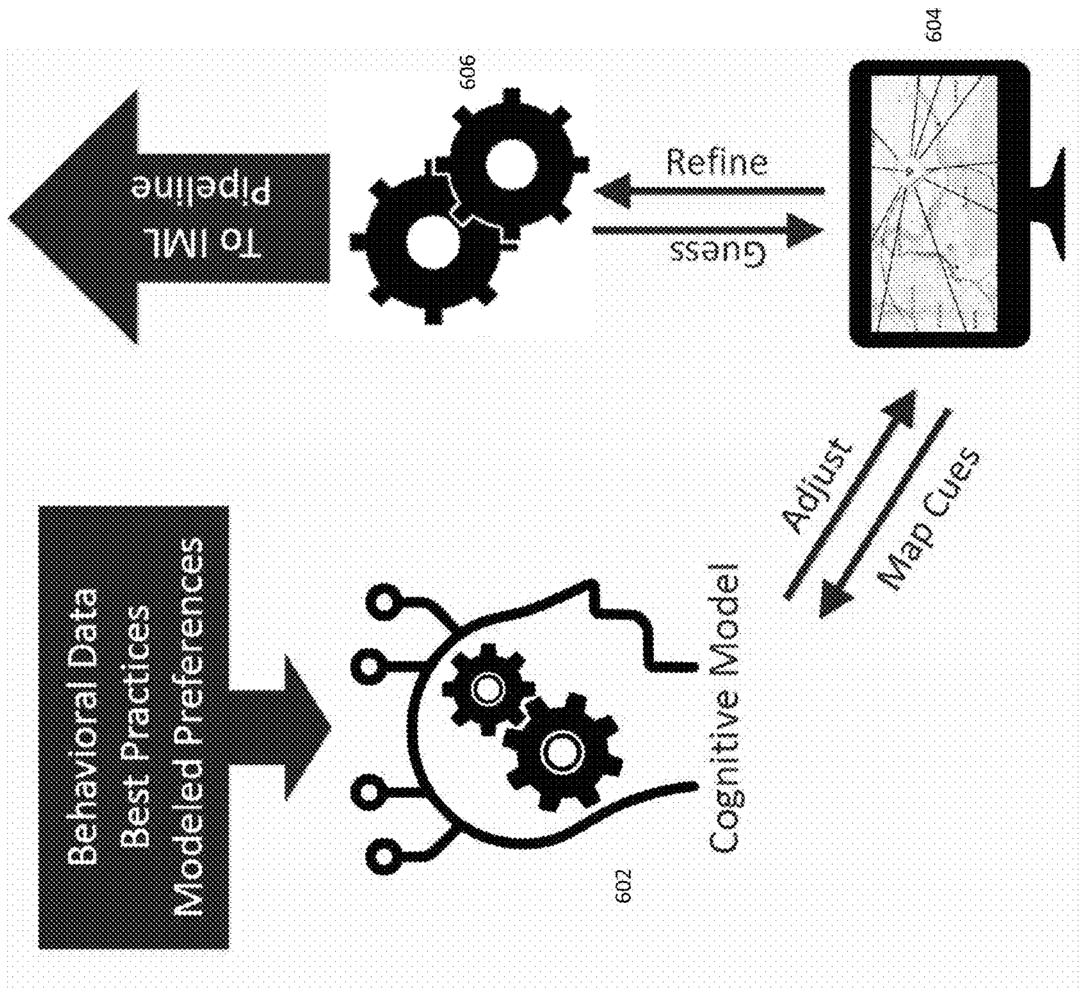
FIG. 6 illustrates a schematic showing an embodiments of an interactive machine learning model via a cognitive model, in accordance with disclosed aspects.
Figure 7:
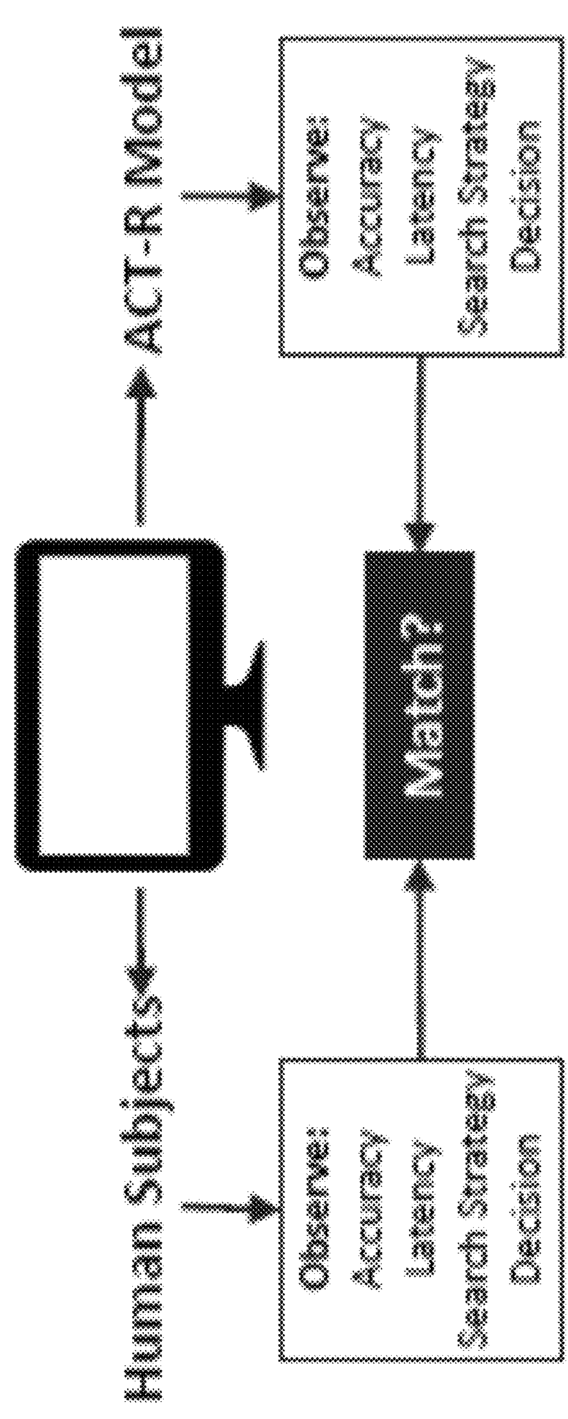
FIG. 7 illustrates a schematic showing an embodiment of validation of a cognitive model, in accordance with disclosed aspects.

As shown in FIGS. 6 and 7, human cognitive behavior can be modeled based on a cognitive architecture (e.g., ACT-R, SOAR, or the like). Cognitive models can simulate users interacting with an interface. In some embodiments, cognitive models can be used to generate synthetic training data for machine learning.

As shown in FIG. 6, the human-based cognitive model 602 can be based on, for example, behavioral data, best practices, model preferences, or the like. The cognitive model can be used for placement of features on a generated digital map 604. The cognitive model may be used to adjust the features of the map generated by a computer/machine 606. The adjustments may be used by the computer for additional maps and/or maps produced in the future.

FIG. 7 illustrates a schematic showing an embodiment of validation of a cognitive model by comparing the model to human behavior. For ACT-R modeling, the following can be observed: accuracy, latency, search strategy, decision. The same features can be observed by human observers. A match (e.g., meets a threshold percentage match and/or comparison) can be determined between the model and the features observed by the human subjects. Based on the comparison, the machine model can be updated, which can be used to generate features displayed on a digital map.

Cognitive Feedback

Explicitly stated preferences, biometric data and cognitive models can help to infer or predict the user's cognitive state and provide cognitive feedback to a machine learning model that optimizes maps to be easier and less frustrating for people to use. Such information may help constrain the problem space of map generating algorithms, or help to identify new statistical features that may be useful in generating better map displays.

Explicitly collected measures, such as the "like" button provided in SmartMaps, can give the model immediate feedback about how well it did when creating a map label layout. Disclosed aspects may include other explicit measures, such as rating the layout or individual labels or neighborhoods of labels. Users may also potentially choose their favorite from among multiple layouts. Preference data may be collected on a per-user basis or combined with data collected from similar users using techniques like collaborative filtering.

Implicit measures, such as tracking user interactions, such as drag and zoom actions, as well as mouse or eye tracking, may help identify if a user may be engaged or confused. Cognitive models may also be used to provide machine learning models with an estimate of how users might perceive or interact with a map. Such models have a long history in the human-computer interaction community for modeling human interactions with an interface. For example, some models have been used to predict a user's subjective perception of clutter, and the cognitive load of editing a map, or completing a specific task using a map interface. Other work showed how using cognitive models to estimate visual saliency and eye-tracking trajectories improved the performance of machine learning algorithms learning to play video games.

Additional research may be needed to compare different cognitive feedback approaches and understand how well they can improve a machine learning model, or how intrusive they will be to the analysts and end users using the maps.

Synthetic Data with Cognitive Models

Machine learning models that generate map displays often involve large problem spaces with many possible features that can be easily generalized given a reasonable amount of training data. Even in interactive applications, which generally can start with little or no data, the model may require a great deal of user interaction before being able to begin generating displays that may be considered preferable to the user. It may be beneficial to shift the burden of generating training data away from the initial developers or the user.

Recent work has considered ways of generating synthetic training data from models to reduce the amount of training data required to create good machine learning models. Positive results have been found when cognitive models may be used to model aspects of human behavior and cognition. Drawing on these lines of research and existing research in map preferences and best practices, a cognitive model may be used to simulate how a user might identify labels in cluttered or confusing areas of the map and identify better placements. By using a cognitive model to simulate the decision processes behind label adjustments, a machine learning model starts with some prior knowledge about features that may be important for generating good label placements. This approach can generate map displays with label placements that may be considered reasonably good for the average user. After the user begins to use the display, the model can be further refined through the interactions and preferences of a user.

Supporting Concept Learning

Disclosed aspects may include using a ML model based on concept learning for understanding the user's reasoning behind the change. In concept learning, the goal may be to create an AI system that can learn the features behind a particular concept. To ensure a concept has been learned properly, the user should be able to easily probe and verify the internal concepts being represented in the system. This may happen through shared language between the user and machine that allows communicating how relationships between the features and attributes represent the concept. Spatial relationships between features can be used to describe spatial concept. This may be extremely useful when generating IML interfaces for region annotation, label placement or other geospatial tasks. Map users and geospatial algorithms may communicate about the spatial relationships between map features, and which attribute ranges lead to good layouts versus poor ones.

Figure 8:
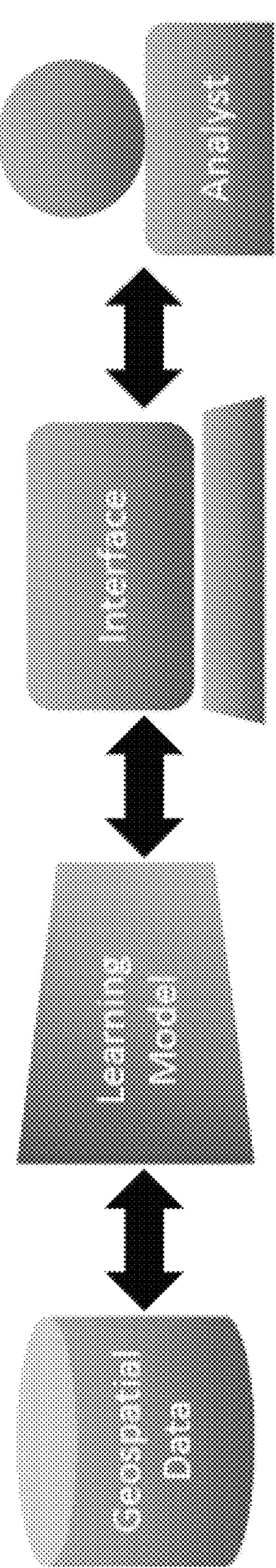
FIG. 8 illustrates a schematic showing an interactive, machine learning diagram for geospatial data, in accordance with disclosed aspects.

FIG. 8 illustrates a schematic showing an interactive machine learning diagram for geospatial data. For example, a fully automated solution may not be accurate enough with use of geospatial data. Accordingly, one example advantage may be that expert knowledge both from the data and analyst side may be used for each map. IML can couple the learning model with the analyst's verification and correction workflow. This can provide a code-free human-machine teaming through an intuitive interface. As shown, the analyst can use an interface to modify a learning model that may be based on geospatial data.

Figure 9:
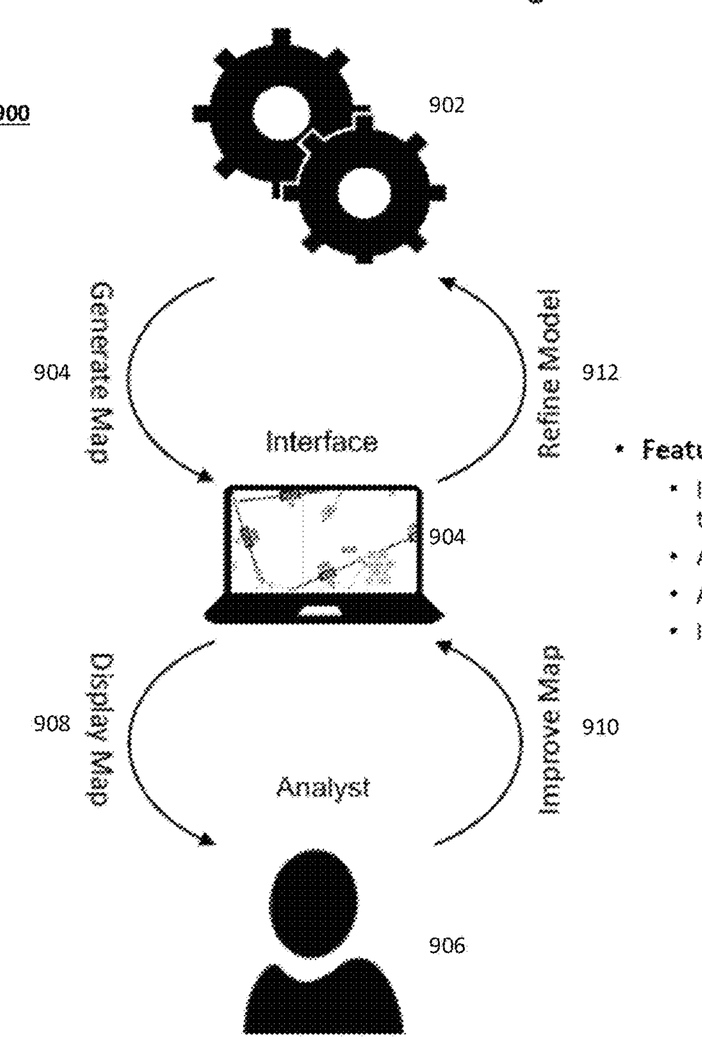
FIG. 9 illustrates a schematic showing an interactive machine learning process for geospatial data, in accordance with disclosed aspects.

FIG. 9 illustrates a schematic showing an interactive machine learning process 900 for geospatial data. As shown, the machine 902 may use geospatial data and machine learning to generate a map at step 908. The map may include features such as labels, layout, and the like, which may be a guess for the machine 902 that may be based on data the machine 902 already has access to. In one example, the machine 902 may learn label placement preferences through map interactions of users to determine which features users may prefer and/or not prefer. The generated map may be displayed on an interface 904. At step 908, the interface 904 (computer) may output and/or display the map to the user 906. The user 906 may receive the generated map. At step 910, the user 906 may provide input based on the generated map. For example, the user 906 may provide positive feedback, such as through a like button, to allow the user 906 to give immediate feedback about a map view. In another example, the input provided by the user 906 may be moving and/or hiding labels on the map, such as within one or more provided constraints. The interactive learning algorithm can apply the feedback and/or user input to future map views. At step 912, the user input may be used by the machine 902 to refine the trained model. For example, the machine 902 may determine that the user prefers a zoom level based on the received input. The process 900 may then start again the refined model.

Figure 10:
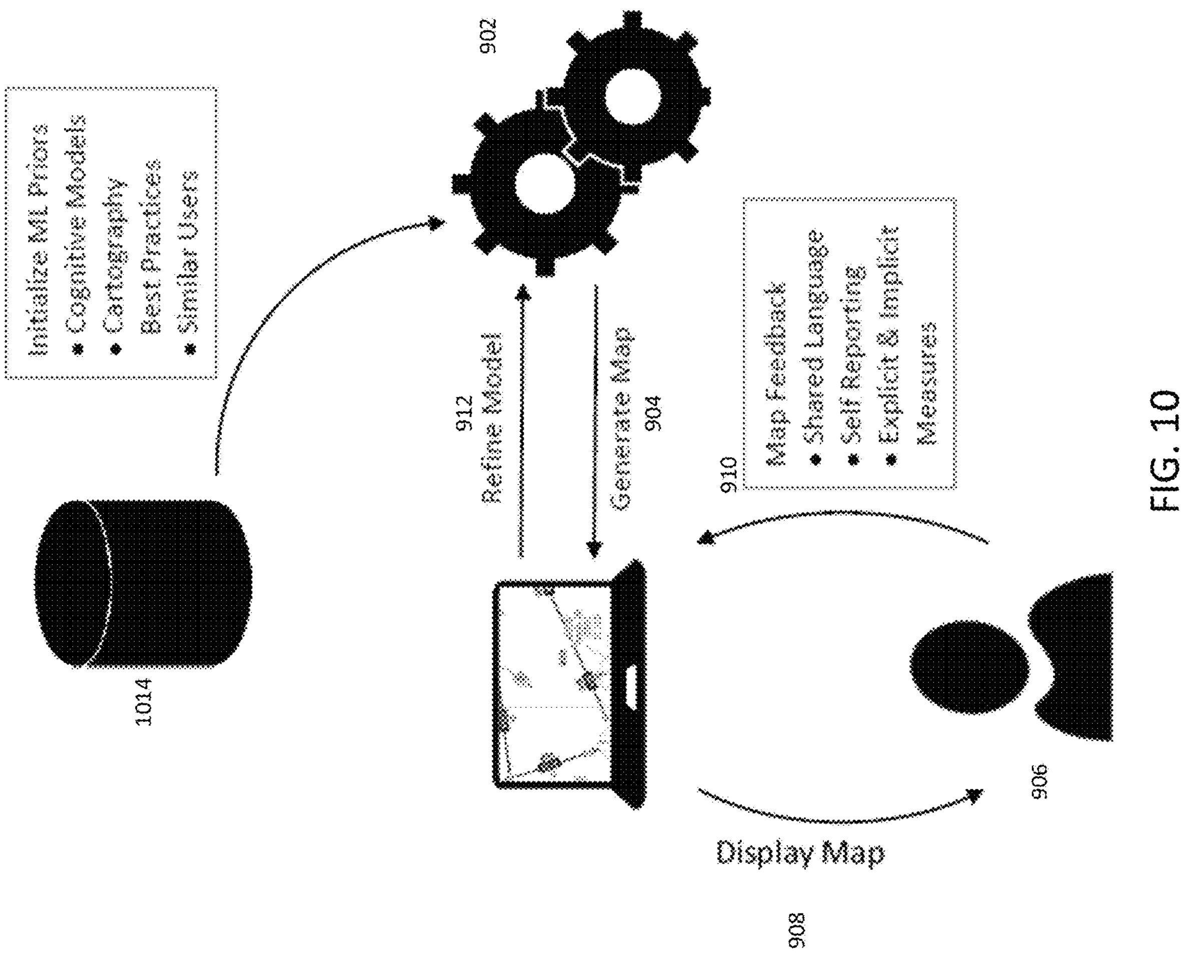
FIG. 10 illustrates a schematic showing an interactive machine learning process for geospatial data, in accordance with disclosed aspects.

FIG. 10 illustrates a schematic showing an interactive machine learning process 1000 for geospatial data. Process 1000 may be similar to or the same as process 900. As shown, the machine 902 may incorporate into the model machine learning priors, such as a cognitive model, cartography best practices, preferences of similar users, or the like. At step 910, the feedback may include shared language, self-reporting, explicitly and implicit measures, or the like.

Figure 11:
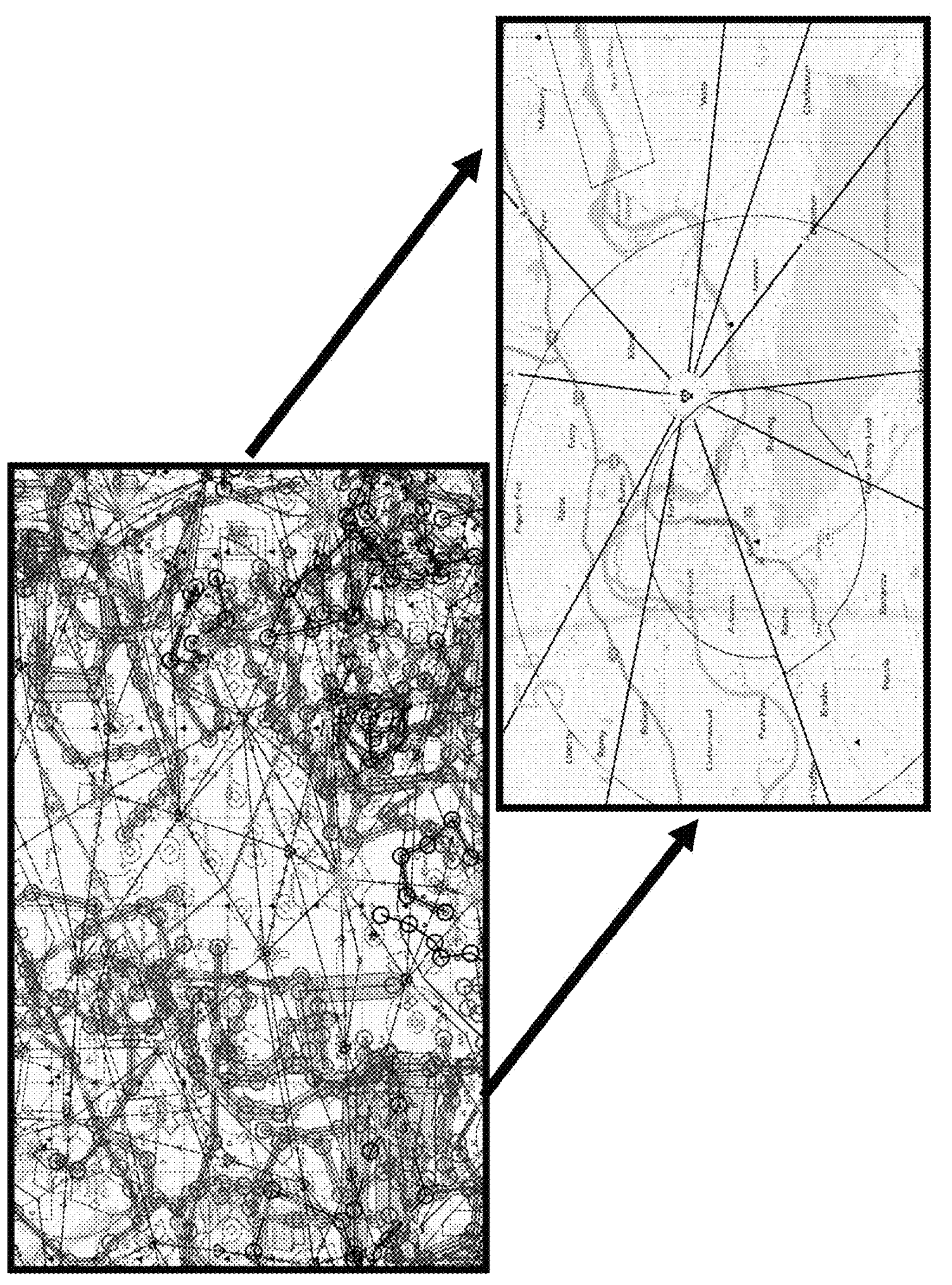
FIG. 11 illustrates an example output map after refinement, in accordance with disclosed aspects.

FIG. 11 illustrates an example output map after refinement. As shown, the top map produced may include confusing and/or hard to read labels and other information on the map image. IML may use feedback from a user/analyst, which may be used to update the machine learning model to produce the, bottom map image, which may be easier to view. In some embodiments, modeled cognitive processes (e.g., perception, visual search, decision-making) can be used to update and/or refine the model. Modeled cognitive feedback can help emulate and understand the reasoning behind the user's input/modifications so that the preference may be propagated throughout the map. Modeled cognitive feedback can be used to refine the ML model (e.g., algorithm optimizes tradeoff between gathering new information vs. minimizing workload, etc.).

FIG. 12 illustrates a schematic showing machine learning output models of varying degrees. Models 1202, 1204, and 1206 may be ML models produced by a computer, such providing labeling or fit for a digital map. For example, models 1202, 1204, and 1206 may be human-assisted machine learning models. Model 1202 shows an underconfident model, which may include that the machine learning algorithm may be learning too slowly. Model 1206 may be an overconfident model, which may have a high cognitive load for the analyst/user. These models may result from having the ML model having too many incorrect, and/or inaccurate guesses, which can result in the analyst being slowed down and/or getting frustrated. These models may not have enough guesses or too many guesses, which may result in the analyst spending more time training the model, such as with input provided by the analyst. Model 1204 may be a cognitive-attuned model, which can be a HAML producing a productive human-machine team based model that has a balance of features. In some embodiments, productivity and improvement of the human-machine team can include the use of self-reporting, implicit feedback, modeled feedback, and the like.

According to some aspects, user preferences can be shown through edits to the map display, which can further train the model, such as about preferred label placements.

Developing an accurate AI/ML model (e.g., an uncertainty model) can ensure that the analyst and model can work together effectively. As an example, consider a system that may be required to label a variety of unknown examples and verify the labels with an analyst. In some cases, the unknown examples will be similar to the known labeled training data and the model will be able to label the data with high confidence that the labels may be accurate. In other scenarios the example may include some underlying features or concepts that might not be well-covered by the training data. The IML system can show labels that may be less confident by first allowing it to improve the model's confidence in those similar cases as the analyst verifies and corrects any mistakes.

Disclosed aspects include providing constraints on the ML models in some embodiments. Consider that there may be a number of different features that a machine algorithm may use to determine where to place a map label or how to annotate a region. If an analyst corrects the map generated by an initial algorithm, there may be a variety of reasons why. It may be possible to improve both the usability and speed of convergence by constraining that problem. As an analogy, consider that designing fully automated cars may be a very difficult problem that has yet to be solved. However, automated trains have existed for decades because the constraints afforded by the rails. These constraints lead to a much more tractable problem to be solved. Constraints can also be used in an IML workflow to reduce the feature space of the problem. The analyst and algorithm can work together on the constrained problem to more quickly converge to an accurate model, even when starting with no training data.

Figure 13A:
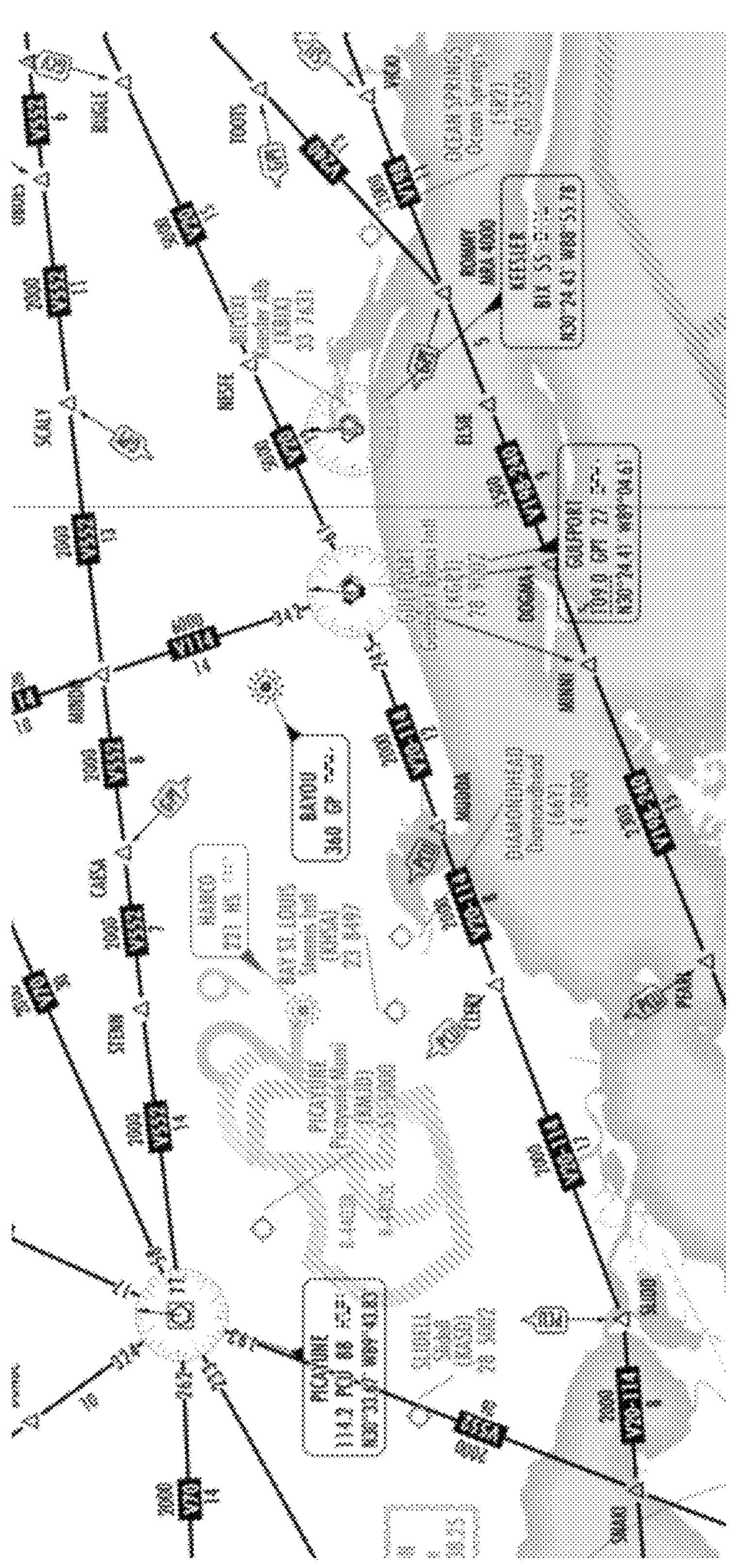
FIG. 13*a* illustrates an example generated map using a ML placement algorithm, in accordance with disclosed aspects.
Figure 13B:
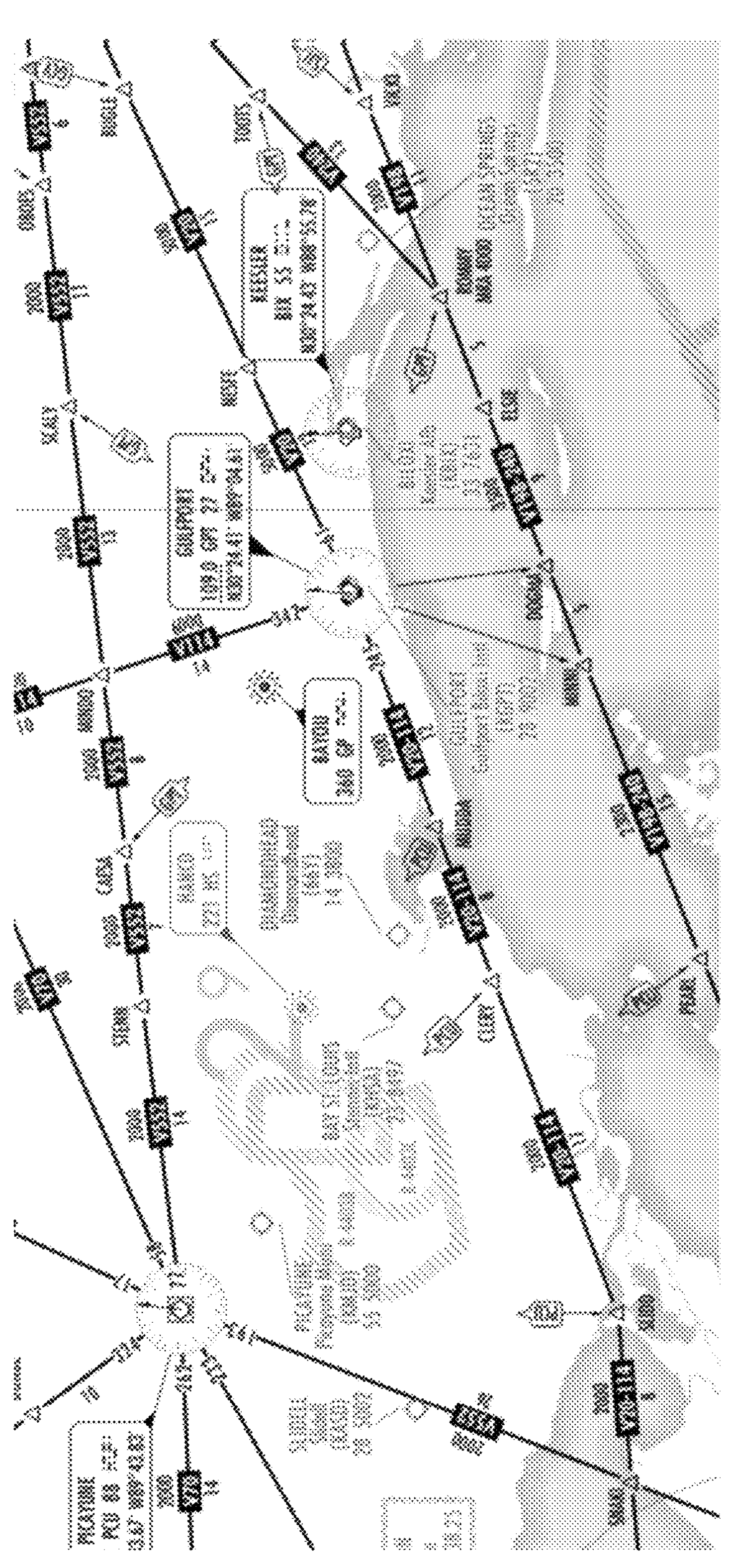
FIG. 13*b* illustrates an example map view after receiving a first set of one or more inputs/revisions/edits from a user, in accordance with disclosed aspects.

Aspects described herein, such as illustrated map examples in FIGS. 13*a* and 13*b*, provide for an OGC 1 compliant map viewing and label placement editing tool that allows the user to intuitively edit label placements. FIG. 13*a* illustrates an example generated map using a ML placement algorithm before having the ML algorithm receive a first set of one or more inputs/revisions/edits from a user. FIG. 13*b* illustrates an example map view after receiving a first set of one or more inputs/revisions/edits from a user, such as via a click-and-drag interface.

Generating digital map displays at various scales and with different sets of visible layers may be a complicated problem that presents many challenges for fully automated algorithms and IML systems. Automatic solutions can generate good map displays in many situations, but it becomes more difficult as the map symbology increases in density and complexity. More computing resources and time may be required to calculate an optimal layout, and this may be further complicated when, the analyst can add new layers or change the map scale. This results in some imperfect views, where labels may obfuscate one another or might not be well distributed, leading to clutter in some areas, while others may be more suitable to label placement.

FIG. 13*a* shows an example output from ML map layout algorithm. The southern portion may be cluttered, while the northeast remains relatively open. A possible improvement may be to move the Gulfport Airport label to the area of white space, northeast of the airport. With digital map editing, the analyst may make this change and the algorithm may learn to apply the preference in similar views. In the following example of receiving an input from a user, consider FIG. 13*a*. Here, the user may notice that the Keesler airport label may be in a cluttered area. The user may enter edit, mode and intuitively click and drag the airport label to an allowed location in a less cluttered area.

The analyst can hide or display layers or move labels to preferred areas on the map. As the user makes these inputs and/or edits, a machine learning model learns which layers may be important to the user, as well as the underlying features that predict their preferred label placements. This preference information can be collected over time for a single user, or aggregated over a set of similar users. The collected data may be then used to implicitly train the model and improve its predictions about layer visibility and good label placements, thus improving its display over time. This use case provides a good example of how a map interface can be designed to implicitly collect information about a user's preferences to improve its display over time.

The user may continue to make changes until satisfied with the view, as in FIG. 13*b*. The underlying ML algorithm keeps track of the edits and can generate a subsequent map based on these inputs and edits (e.g., apply them to similar map views, or the like).

In some embodiments, the analyst can provide input/edits inside the map-viewing client. The ML algorithm may receive the inputs and can implicitly learns label placements based on a user's preferences over time. The ML algorithm may aggregate label placement preferences over different map-views. In some cases, if more than one custom position exists for a label, the ML algorithm may use the custom position with the most similar map-view. The ML algorithm may remember these corrections for future label placements Editing can include an act that either moves or hides a label regarding its default position. When editing, one or more embodiments may constrain the movement of a label based on the predefined rules or constraints used when making the original map. In some embodiments, a constraint might prevent the user from moving labels to unacceptable locations. In some embodiments, a constraint can limit the search space that the machine may consider when considering a label's best placement.

Figure 14:
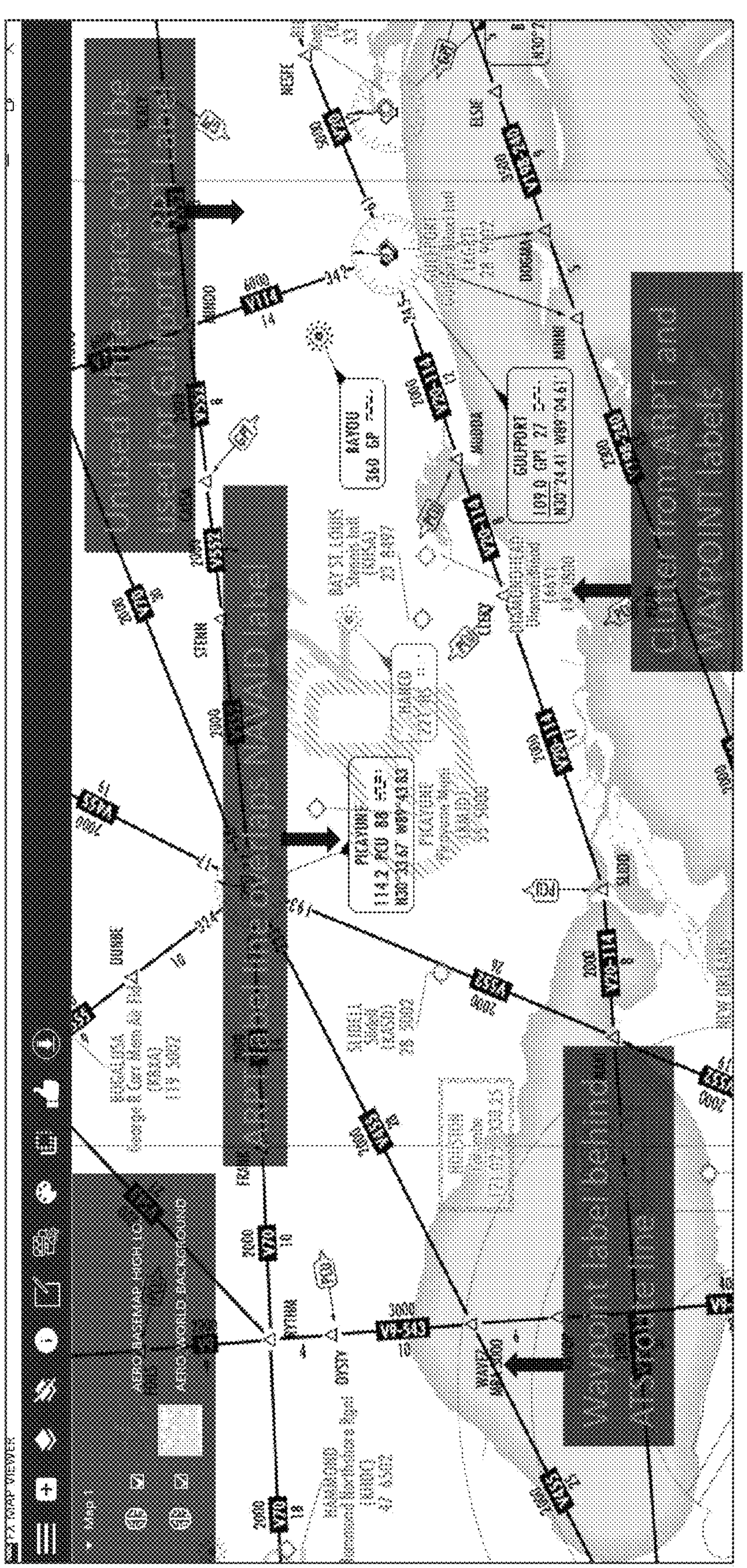
FIG. 14 illustrates example ways a map can be revised, in accordance with disclosed aspects.

Another example map with labels is illustrated in FIG. 14. FIG. 14 shows some ways the map can be revised, for example, to improve labeling, to remove clutter, or the like. A user may consider these in determining what type of inputs to provide to the ML model.

In some embodiments, editing constraints may include one or more types of movements. For example, three types of movement may include: linear, radial, and polygonal. Linear movements can be one dimensional and describe a label's position along a line defined by two points (e.g., the route labels starting with "V" in FIGS. 13*a* and 13*b*). Radial movements can be two-dimensional and describe a label that can be placed some distance away, in any direction, from an anchor point (e.g., the airport labels in FIGS. 13*a* and 13*b*, such as Diamondhead). Finally, polygonal movements can be two-dimensional and describe a label that can be placed anywhere inside a pre-defined polygon (such as the Special Use Airspace areas labeled by B-44038 and B-4403C in FIGS. 13*a* and 13*b*).

A constraint can be in place to help the user and/or the machine. Constraints help to prevent invalid label movements and can help both users and the algorithm focus on the areas the label can be moved to. For example, on cluttered maps, users and algorithms can struggle to identify acceptable label locations that keep labels near their landmark and avoid poor placements, such as collisions with other labels. In this example, constraints may include preventing labels from near the constraint's boundary or contextual constraints, such as preventing labels in already cluttered areas. Constraining the placements to a particular area attempts to balance the needs of a user to move the label, while also ensuring it stays close enough to its landmark. These constraints also greatly reduce the number of underlying features the machine learning implementation may account for when inferring the reasoning behind user edits.

After the user makes edits to a map in accordance with disclosed embodiments, a learning algorithm attempts to apply these edits to future similar map views. This process may be further optimized by considering why a label needs to be edited. In some embodiments, a "like" button (or other reinforcement input option) may be provided so that the user can give the model immediate feedback about the current map view. In some embodiments, the user may have the ability to provide contextual input when the map view may be in a satisfactory state (i.e. the map view requires no edits). Reasons for label movement can include label collisions, placements that may be more preferred or pleasing to the user, or the like. Disclosed aspects can model the context and reasoning behind the placement and use that to improve other map views. One or more aspects may enable the machine and the user to communicate about the underlying model and reasoning being used to choose the label placements. For example, the user may provide input to explain to the machine that a label was moved to declutter an area so that other labels may be placed nearby (such as moving the BAYOU label which allows the DIAMONDHEAD label to be placed without overlap).

Disclosed aspects provide, in some embodiments, the benefits of creating a map display that allows users to edit the labels and then generalize those changes to other map views. It represents a map labeling system that incorporates user interactions and explicit feedback to interactively improve a display over time. Disclosed aspects may be used for map viewing, label placement edits, or the like. The present disclosure enables map users to edit their view to match their preferences. The present disclosure may learn from these edits and may apply them to similar views in the future. This allows for ML that learns (for maps) from users to improve a map view. We also introduced many aspects of ongoing and future research designed to explore the best ways of learning from user data to generate better interactive maps.

FIGS. 15*a*-15*f* illustrate an example reduction to practice in accordance with disclosed aspects. According to some aspects, a mapping context function may be determined and implemented by the ML algorithm. The mapping context function may learn the user's desired visualization of the map based on the user's behavior. The mapping context function may define an input/output feature space for visualizing digital maps. The mapping context function may remove the need for users to repetitively change visualization parameters when viewing a map, such as with scale, visibility, thinning, uncertainty boundaries, or the like.

In some embodiments, input features may include a user's current view of the map and the context within the view. These input features may include viewport bounding box, land-to-sea ratio, number of landmarks, uncertainty values of visual data, or the like. Some output features may include parameters set for each map later, such as Visibility, Opacity, Priority, Layer Thinning, Label positioning, Symbology, Visualization of uncertainty, or the like. Some embodiments may include a Function estimator, which may learn and/or apply a user's preferences by utilizing Online learning (Learn and apply changes immediately), Reinforcement (User might not change current map view or clicks a "like" button), Correction (User changes the current map view), or the like. Addresses a critical gap in effectively viewing maps with very many map layers After training the ML algorithm, the viewer/user of the map might not need to change layer visualization parameters when navigating the map. In some embodiments, instead of programming visualization of layers explicitly, digital map developers may use this method to build maps in a code-free way. According to some aspects, the mapping context function may be changed to create new context-specific mapping visualizations based on the following examples: User's behavior, Situation at hand, Type of map, or the like.

Figure 15A:
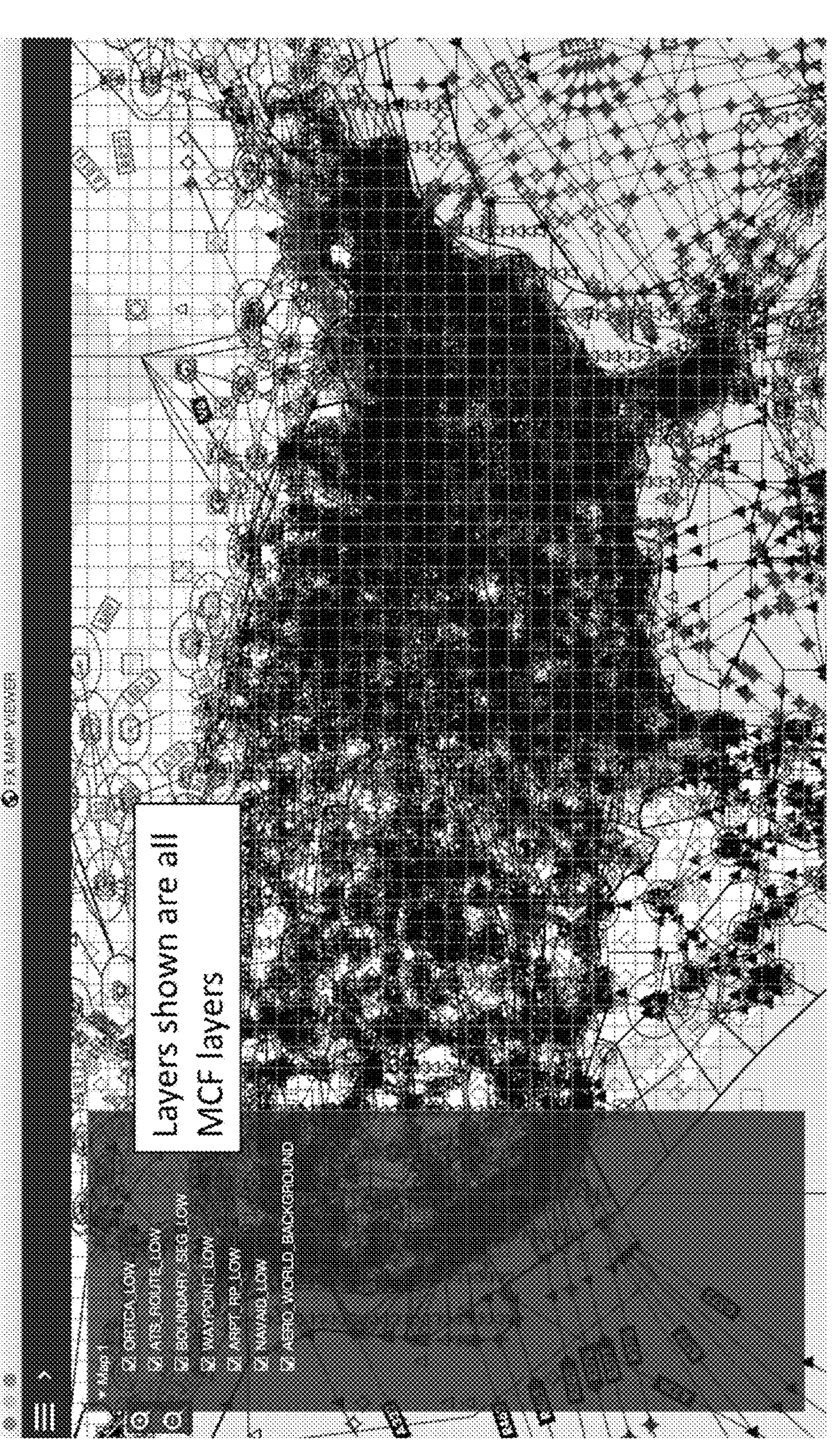
FIGS. 15*a*-15*f* illustrate an example reduction to practice, in accordance with disclosed aspects.
Figure 15B:
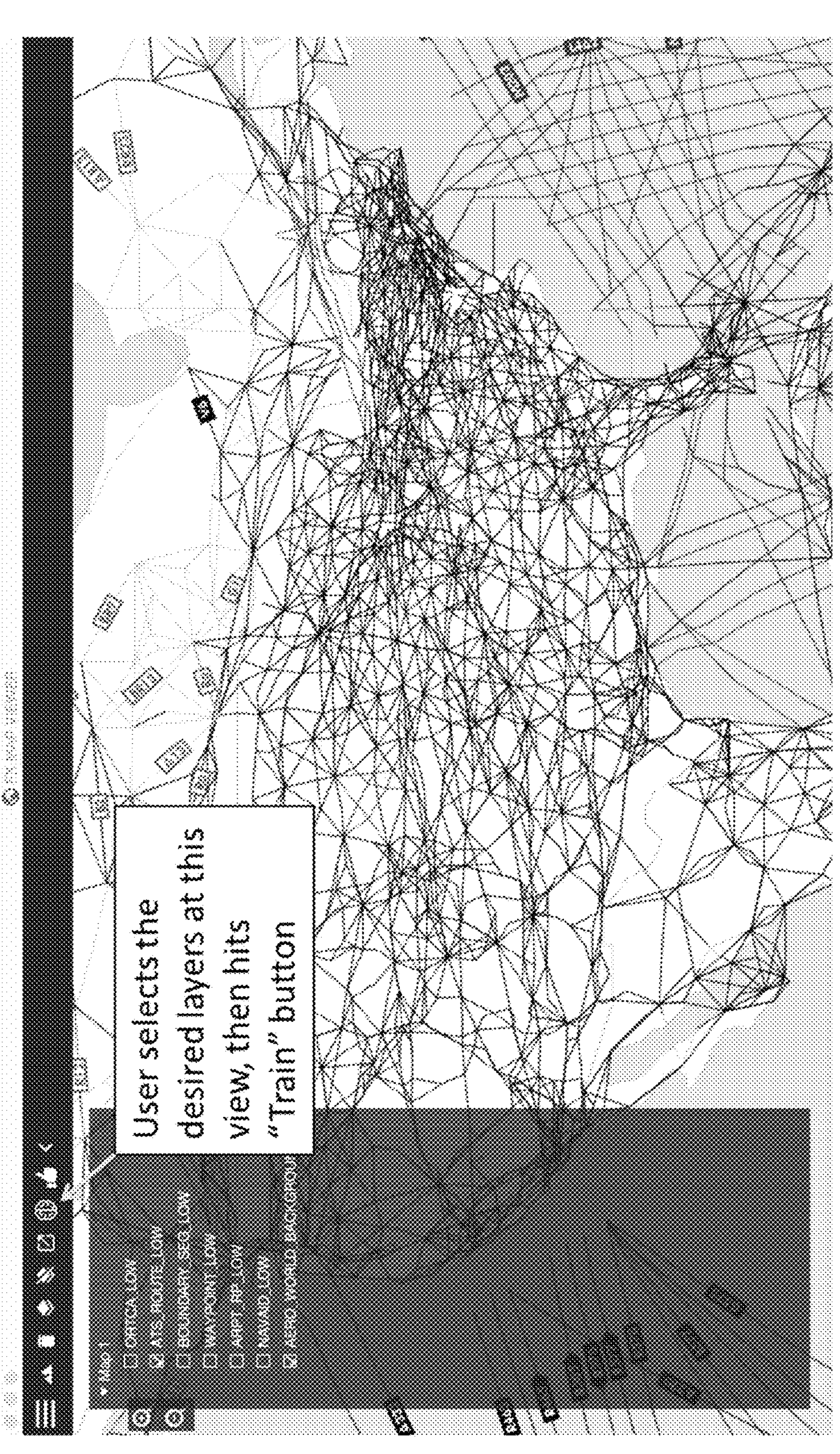
Figure 15C:
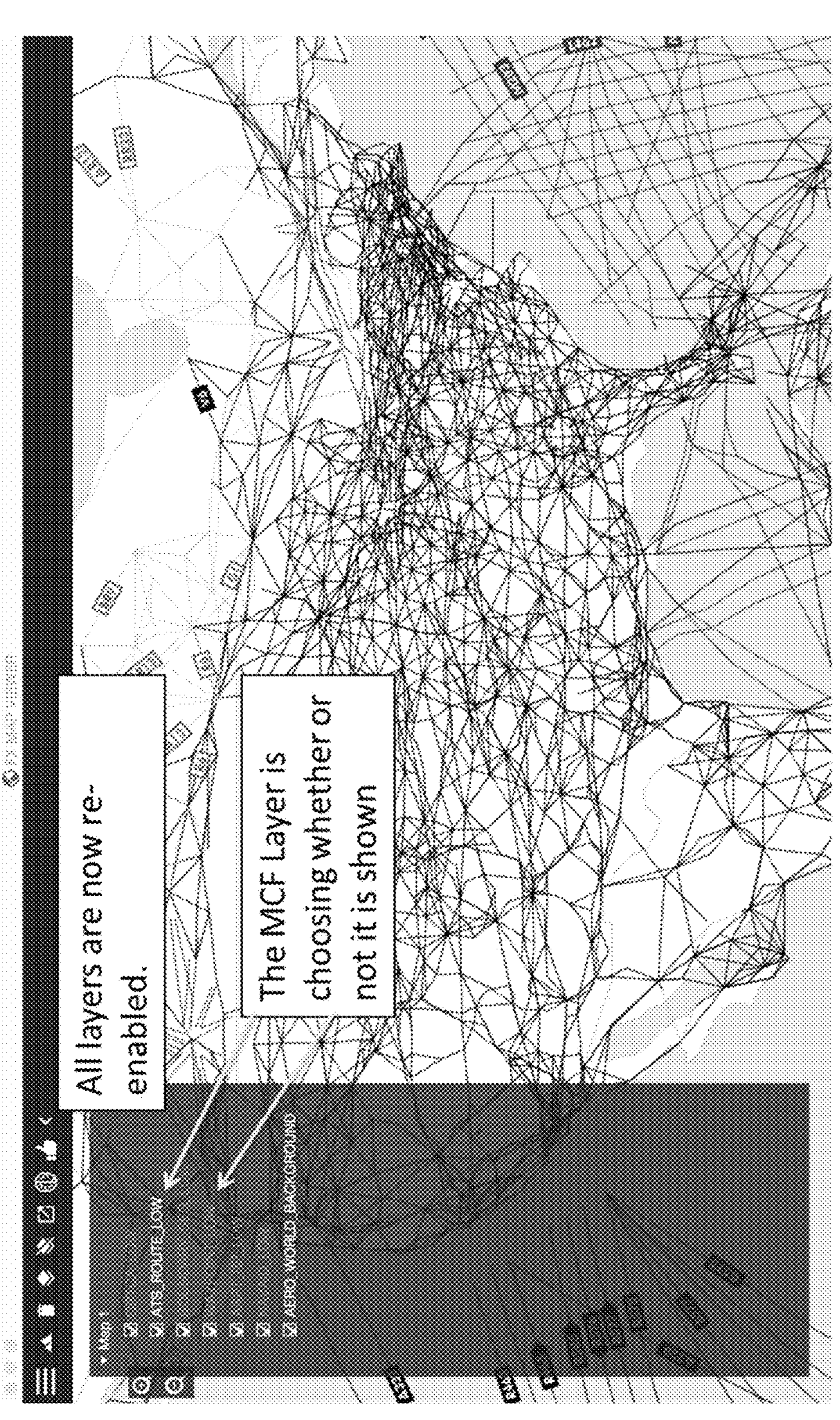
Figure 15D:
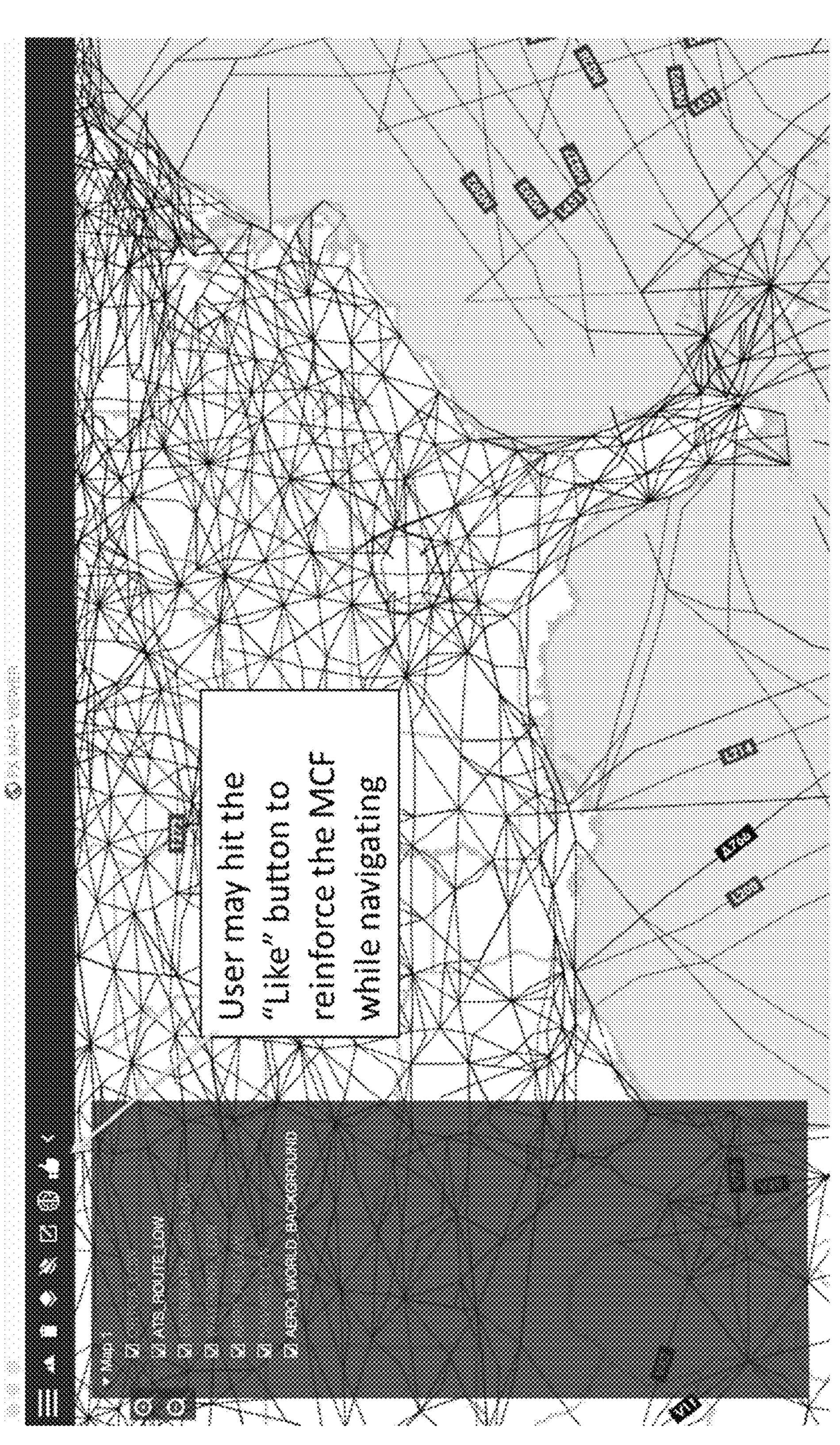
Figure 15E:
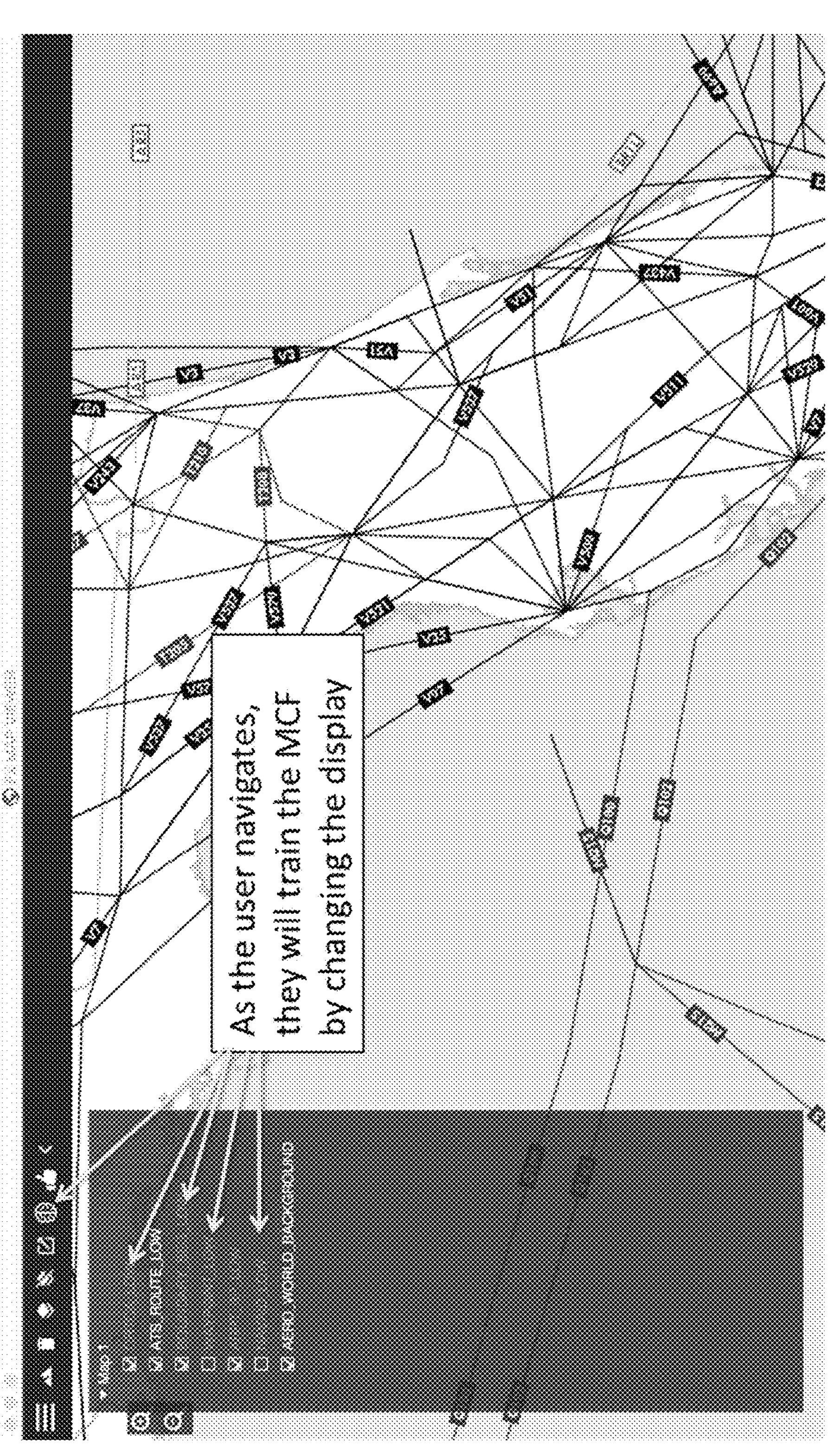
Figure 15F:
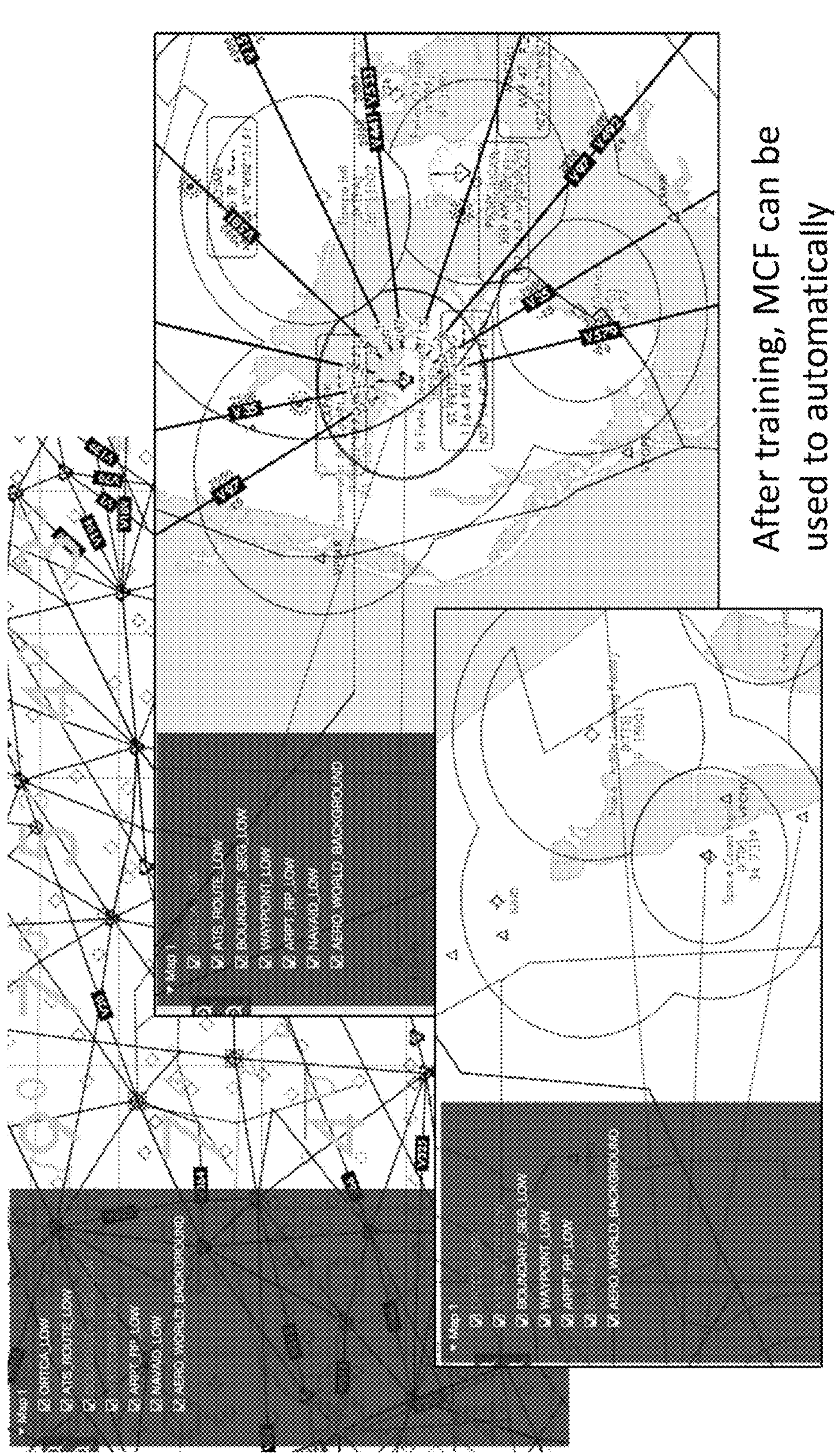

As shown in FIGS. 15*a*-15*f*, an example reduction to practice can be shown. In this one example, disclosed aspects were implemented via a JavaFX map client implementation developed by NRL Code 7443. According to some aspects, a bounding box and scale can be used as input features, and layer visibility can be used as an output feature. As shown in FIG. 15*a*, the layers shown may be MCF layers. As shown in FIG. 15*b*, the user can select the desired layers at this view, and then hit a "train" button to train the ML algorithm. As shown in FIG. 15*c*, the layers may be now re-enabled, and the MCF layer may be choosing whether or not it may be shown. As shown in FIG. 15*d*, the user may provide input, such as hitting a "like" button to reinforce the MCF while navigating. In some embodiments, the user can provide input at a number of different views while navigating. As shown in FIG. 15*e*, the user can navigate to a different view. The user may train the MCF by changing the display with different features, overlays, and the like. As shown in FIG. 15*f*, after training, the user might not need to adjust layer visibility, as the MCF ML algorithm may automatically provide a view of a subsequent map based on the training.

According to some aspects, the MCF ML algorithm may prioritize workflow for the analyst based on active machine learning. For example, after the user provides and input, such as making a change to or on a displayed map, the model can immediately change (i.e., improves) and adjusts the model. The machine may use the updated model to produce a subsequent map (e.g., an improvement of a currently or previously displayed map, a new map generated based on the inputs, or the like)

Figure 16:
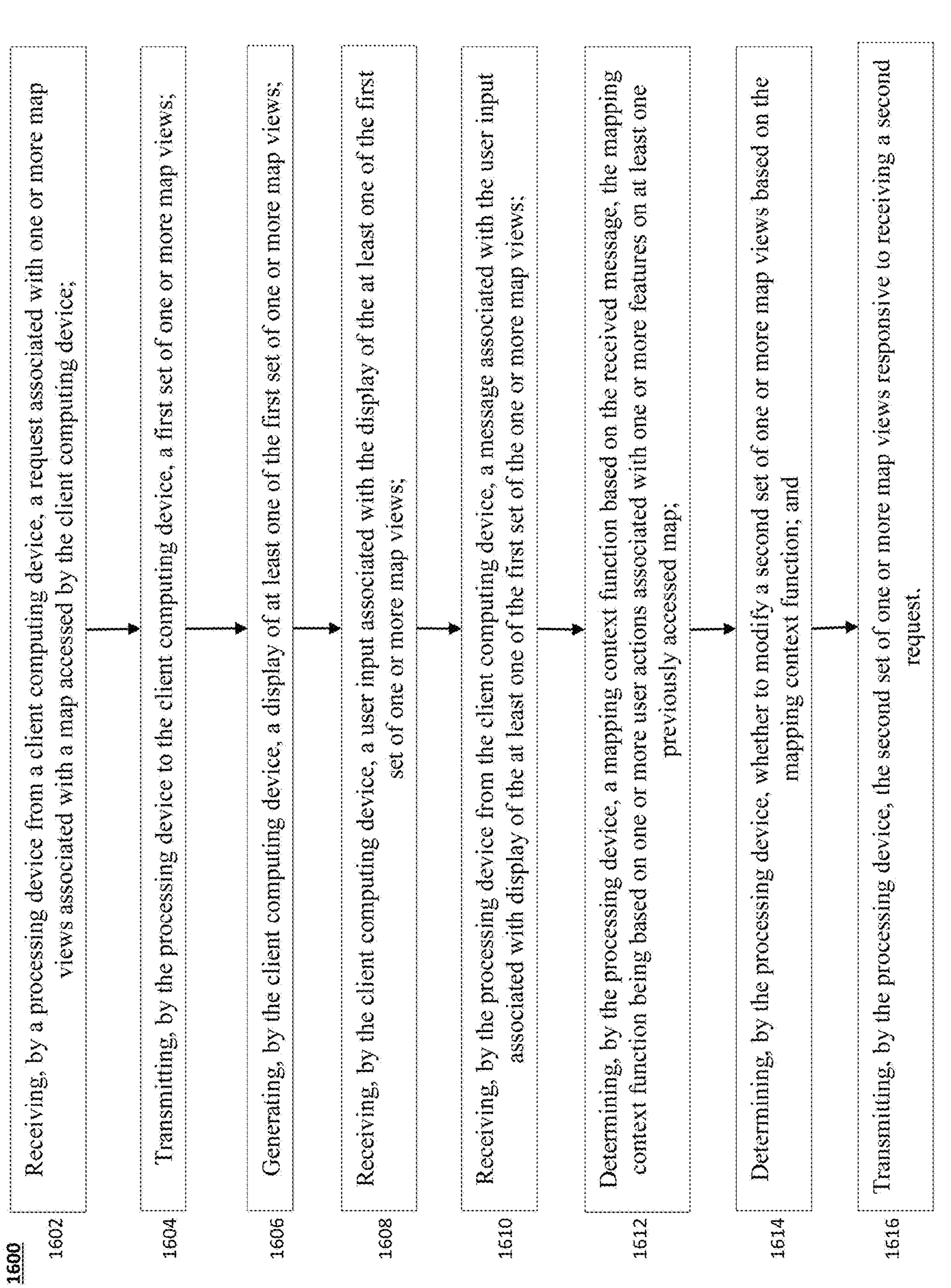
FIG. 16 illustrates an example method, in accordance disclosed aspects.

FIG. 16 illustrates an example method 1600, in accordance with one or more disclosed aspects. Step 1602 may include receiving, by a processing device from a client computing device, a request associated with one or more map views associated with a map accessed by the client computing device. Step 1604 may include transmitting, by the processing device to the client computing device, a first set of one or more map views. Step 1606 may include generating, by the client computing device, a display of at least one of the first set of one or more map views. Step 1608 may include receiving, by the client computing device, a user input associated with the display of the at least one of the first set of one or more map views. Step 1610 may include receiving, by the processing device from the client computing device, a message associated with the user input associated with display of the at least one of the first set of the one or more map views. Step 1612 may include determining, by the processing device, a mapping context function based on the received message, the mapping context function being based on one or more user actions associated with one or more features on at least one previously accessed map. Step 1614 may include determining, by the processing device, whether to modify a second set of one or more map views based on the mapping context function. Step 1616 may include transmitting, by the processing device, the second set of one or more map views responsive to receiving a second request. One or more steps may be repeated, added, modified, and/or excluded.

Figure 17:
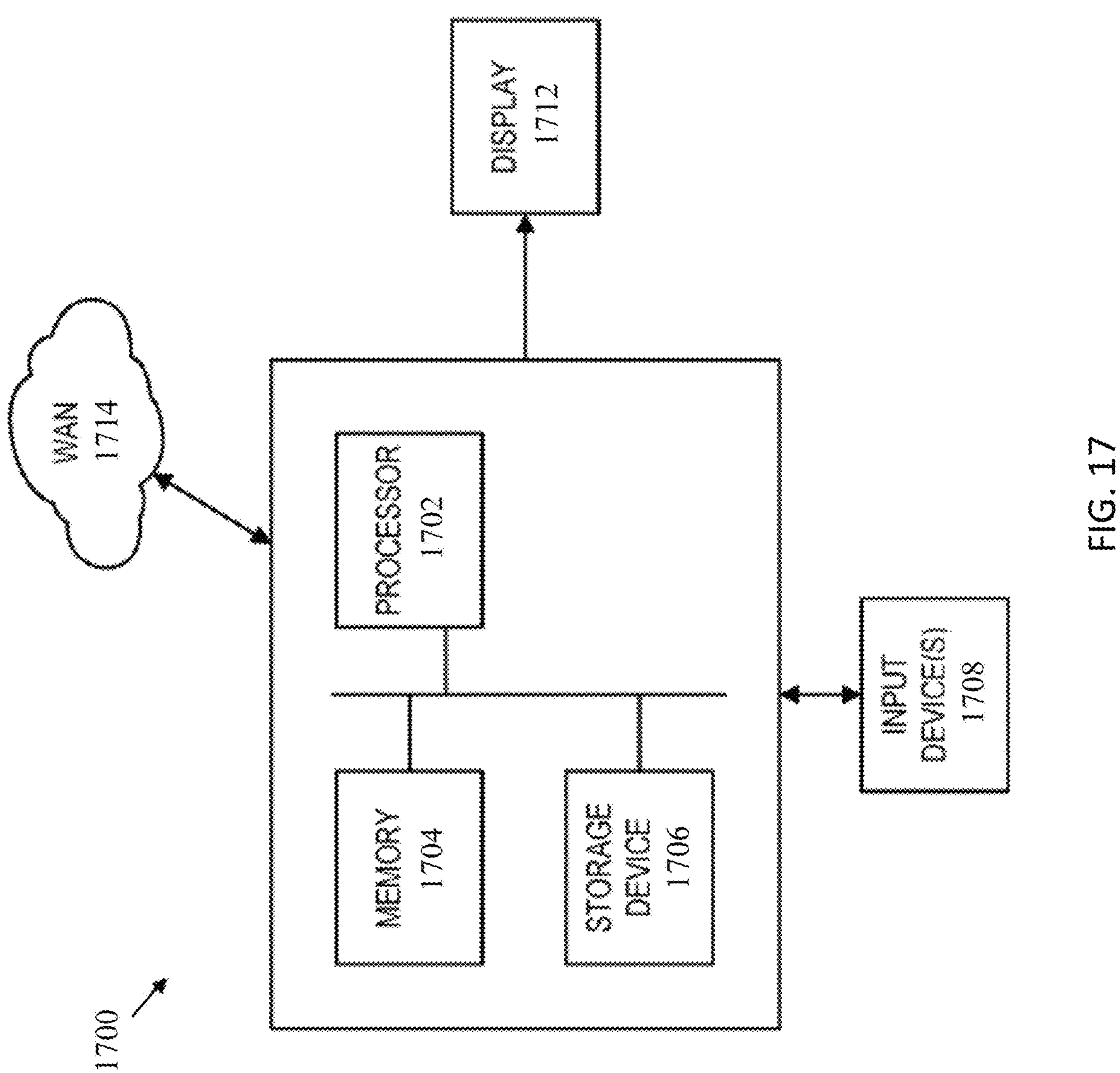
FIG. 17 illustrates a diagram of an example computer system, in accordance disclosed aspects.

One or more aspects described herein may be implemented on virtually any type of computer regardless of the platform being used. For example, as shown in FIG. 17, a computer system 1700 includes a processor 1702, associated memory 1704, a storage device 1706, and numerous other elements and functionalities typical of today's computers (not shown). The computer 1700 may also include input means 1708, such as a keyboard and a mouse, and output means 1712, such as a monitor or LED. The computer system 1700 may be connected to a local area network (LAN) or a wide area network (e.g., the Internet) 1714 via a network interface connection (not shown). Those skilled in the art will appreciate that these input and output means may take other forms.

Further, those skilled in the art will appreciate that one or more elements of the aforementioned computer system 1700 may be located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions to perform embodiments of the disclosure may be stored on a computer-readable medium (i.e., a non-transitory computer-readable medium) such as a compact disc (CD), a diskette, a tape, a file, or any other computer readable storage device. The present disclosure provides for a non-transitory computer readable medium comprising computer code, the computer code, when executed by a processor, causes the processor to perform aspects disclosed herein.

Embodiments for an interactive mapping tool using machine learning have been described. Although particular embodiments, aspects, and features have been described and illustrated, one skilled in the art may readily appreciate that the aspects described herein is not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

What is claimed is:

1. A method comprising:

receiving, by a processing device from a client computing device, a request associated with one or more map views associated with a map accessed by the client computing device;

transmitting, by the processing device to the client computing device, a first set of one or more map views;

generating, by the client computing device, a display of at least one of the first set of one or more map views;

receiving, by the client computing device, a user input associated with the display of the at least one of the first set of one or more map views;

receiving, by the processing device from the client computing device, a message associated with the user input associated with display of the at least one map view of the first set of the one or more map views, wherein the user input comprises cognitive information associated with the user;

determining, by the processing device and based on the received cognitive information, a cognitive state of the user associated with the least one map view;

generating, by the processing device and based on the cognitive state of the user associated with the at least one map view, a cognitive model that simulates interaction by the user with one or more features displayed on the at least one map view, wherein the simulation accounts for the cognitive state of the user, wherein the generated cognitive model is used to simulate how the user identifies one or more labels in a cluttered area of the map;

constraining, by the processing device and based on the generated cognitive model, a problem space associated with the at least one map view by reducing a machine learning feature space based on the simulation of how the user identifies the one or more labels in the cluttered area of the map, wherein the reduced machine learning feature space reduces one or more underlying features a machine learning model accounts for based on the cognitive state of the user;

determining, by the processing device, a mapping context function based on the received message, the mapping context function being based on one or more user actions associated with one or more features on at least one previously accessed map;

modifying, by the processing device, a second set of one or more map views based (i) on the mapping context function, (ii) on the generated cognitive model, and (iii) on the constrained problem space associated with the at least one map view, wherein the modifying includes identifying one or more better placements associated with the one or more labels based on the reduced feature space; and transmitting, by the processing device, the modified second set of one or more map views responsive to receiving a second request.

2. The method of claim 1, wherein the request is received responsive to the client computing device receiving an interactive input associated with the accessed map.

3. The method of claim 1, wherein the user input is associated with a modification of at least one characteristic associated with the displayed at least one map view.

4. The method of claim 3, wherein the message associated with the user input comprises a message indicating the modification of at least one characteristic associated with the displayed at least one map view, wherein the method further comprises modifying, by the processing device, the second set of one or more map views based on the modification of the at least one characteristic associated with the displayed at least one map view.

5. The method of claim 4, wherein modifying, by the processing device, the second set of one or more map views based on the modification of the at least one characteristic associated with the displayed at least one map view comprises modifying at least one of the map views in the first set of one or more map views.

6. The method of claim 4, wherein the second set of one or more map views is associated with a second map different from the map accessed by the client computing device.

7. The method of claim 1, wherein the user input comprises contextual information associated with one or more displayed features on the displayed at least one map view.

8. The method of claim 7, wherein contextual information comprises an indication of a cluttered area associated with a displayed feature on the displayed at least one map view.

9. The method of claim 1, wherein user input comprises a rating associated with the received one or more map views.

10. The method of claim 9, wherein the rating comprises an indication agreeing with the displayed at least one map view.

11. The method of claim 1, wherein the second set of one or more map views is associated with a second map different from the map accessed by the client computing device.

12. The method of claim 1, wherein each of the first set of one or more map views comprises a distinct set of one or more layers, where each of the one or more layers is configured to overlay the map being accessed by the client computing device.

13. The method of claim 1, wherein the user input is associated with at least a first constraint associated with the displayed at least one map view.

14. The method of claim 1, wherein the cognitive state of the user comprises a level of engagement of the user associated with the at least one map view.

15. The method of claim 1, wherein the cognitive state of the user comprises a level of confusion of the user associated with the at least one map view.

16. The method of claim 1, wherein the cognitive information comprises eye tracking information.

17. The method of claim 1, wherein the cognitive model comprises an estimate of the user's subjective perception of clutter associated with the at least one map view.

18. The method of claim 1, wherein the cognitive model comprises an estimate of the user's perceived cognitive load of editing the at least one map view.

19. The method of claim 1, wherein the cognitive model comprises an estimate of the user's perceived cognitive load of completing a specific task using the at least one map view.

20. The method of claim 1, wherein the cognitive model is used to generate synthetic training data for machine learning.

21. The method of claim 20, wherein the synthetic training data is used to simulate the user's interaction with the at least one map view.

22. The method of claim 1, wherein the cognitive model is used to simulate how the user identifies one or more labels in a cluttered area of the map and to identify one or more better placements associated with the one or more labels.

23. A method comprising:

receiving, by a processing device, a request associated with one or more map views associated with a map accessed by a client computing device;

transmitting, by the processing device to the client computing device, a first set of one or more map views;

receiving, by the processing device, a user input associated with the display of the at least one map view of the first set of one or more map views, the user input being associated with at least one display characteristic associated with the first set of one or more map views, wherein the user input comprises cognitive information associated with the user;

determining, by the processing device and based on the received cognitive information, a cognitive state of the user associated with the least one map view;

generating, by the processing device and based on the cognitive state of the user associated with the at least one map view, a cognitive model that simulates interaction by the user with one or more features displayed on the at least one map view, wherein the simulation accounts for the cognitive state of the user, wherein the generated cognitive model is used to simulate how the user identifies one or more labels in a cluttered area of the map;

constraining, by the processing device and based on the generated cognitive model, a problem space associated with the at least one map view by reducing a machine learning feature space based on the simulation of how the user identifies the one or more labels in the cluttered area of the map, wherein the reduced machine learning feature space reduces one or more underlying features a machine learning model accounts for based on the cognitive state of the user;

determining, by the processing device, a mapping context function based on the user input, the mapping context function being based on one or more user actions associated with one or more features on at least one previously accessed map;

modifying, by the processing device, a second set of one or more map views based (i) on the mapping function, (ii) on the generated cognitive model, and (iii) on the constrained problem space associated with the at least one map view, wherein the modifying includes identifying one or more better placements associated with the one or more labels based on the reduced feature space; and transmitting, by the processing device, the modified second set of one or more map views.

24. The method of claim 23, wherein transmitting, by the processing device, the modified second set of one or more map views comprises transmitting the modified second set of one or more map views to a second client computing device different from the client computing device.

25. The method of claim 23, wherein transmitting, by the processing device, the modified second set of one or more map views comprises transmitting the modified second set of one or more map views to the client computing device.

26. The method of claim 23, wherein the second set of one or more map views is associated with a second map different from the map accessed by the client computing device.

27. The method of claim 23, wherein the cognitive state of the user comprises a level of engagement of the user associated with the at least one map view.

28. The method of claim 23, wherein the cognitive state of the user comprises a level of confusion of the user associated with the at least one map view.

29. The method of claim 23, wherein the cognitive information comprises eye tracking information.

30. The method of claim 23, wherein the cognitive model comprises an estimate of the user's subjective perception of clutter associated with the at least one map view.

31. The method of claim 23, wherein the cognitive model comprises an estimate of the user's perceived cognitive load of editing the at least one map view.

32. The method of claim 23, wherein the cognitive model comprises an estimate of the user's perceived cognitive load of completing a specific task using the at least one map view.

33. The method of claim 23, wherein the cognitive model is used to generate synthetic training data for machine learning.

34. The method of claim 33, wherein the synthetic training data is used to simulate the user's interaction with the at least one map view.

35. The method of claim 23, wherein the cognitive model is used to simulate how the user identifies one or more labels in a cluttered area of the map and to identify one or more better placements associated with the one or more labels.

36. A method comprising:

transmitting, by a client computing device to a processing device, a request associated with one or more map views associated with a map accessed by the client computing device;

receiving, by the client computing device, a first set of one or more map views;

generating, by the client computing device, a display of at least one map view of the first set of one or more map views;

receiving, by the client computing device, a user input associated with the display of the at least one map view of the first set of one or more map views;

transmitting, by the client computing device to the processing device, a message associated with the user input associated with display of the at least one map view of the first set of the one or more map views, wherein the user input comprises cognitive information associated with the user;

receiving, by the client computing device from the processing device, a second set of one or more map views, the second set of one or more map views being based on:

(i) a mapping context function that is based on the transmitted message and on one or more user actions associated with one or more features on at least one previously accessed map, (ii) a cognitive model, wherein the cognitive model is generated by the processing device based on a cognitive state of the user associated with the at least one map view, the cognitive state of the user being based on the received cognitive information, wherein the cognitive model simulates interaction by the user with one or more features displayed on the at least one map view, wherein the simulation accounts for the cognitive state of the user, wherein the generated cognitive model is used to simulate how the user identifies one or more labels in a cluttered area of the map, and (iii) a constrained problem space based on the generated cognitive model, the constrained problem space being associated with the at least one map view by reducing a machine learning feature space based on the simulation of how the user identifies the one or more labels in the cluttered area of the map, wherein the reduced machine learning feature space reduces one or more underlying features a machine learning model accounts for based on the cognitive state of the user; and generating, by the client computing device, a display at least one of the received second set of one or more map views, wherein the received second set of one or more map views is modified based (i) on the mapping context function, (ii) on the generated cognitive model, and (iii) on the constrained problem space associated with the at least one map view, wherein the modifying includes identifying one or more better placements associated with the one or more labels based on the reduced feature space.

37. The method of claim 36, wherein the second set of one or more map views is associated with a second map different from the map accessed by the client computing device.

38. The method of claim 36, wherein the user input is associated with a modification of at least one parameter of the displayed at least one map view.

* * * * *